US009444981B2

(12) United States Patent
Bellis et al.

(10) Patent No.: US 9,444,981 B2
(45) Date of Patent: Sep. 13, 2016

(54) PORTABLE STRUCTURED LIGHT MEASUREMENT MODULE/APPARATUS WITH PATTERN SHIFTING DEVICE INCORPORATING A FIXED-PATTERN OPTIC FOR ILLUMINATING A SUBJECT-UNDER-TEST

(75) Inventors: Matthew W. Bellis, Lexington, KY (US); Daniel L. Lau, Lexington, KY (US); Hideo Hara, Uenohara (JP)

(73) Assignee: Seikowave, Inc., Lexington, KY (US)

( * ) Notice: Subject to any disclaimer, the term of this patent is extended or adjusted under 35 U.S.C. 154(b) by 660 days.

(21) Appl. No.: 13/559,593

(22) Filed: Jul. 26, 2012

(65) Prior Publication Data

US 2013/0188012 A1    Jul. 25, 2013

Related U.S. Application Data

(60) Provisional application No. 61/511,971, filed on Jul. 26, 2011.

(51) Int. Cl.
*H04N 5/225*    (2006.01)

(52) U.S. Cl.
CPC .......... *H04N 5/2252* (2013.01); *H04N 5/2251* (2013.01); *H04N 2005/2255* (2013.01)

(58) Field of Classification Search
CPC ..................................................... H04N 5/225
USPC ............. 348/42, 50, 135; 356/601, 603, 479
See application file for complete search history.

(56) References Cited

U.S. PATENT DOCUMENTS

| 5,633,755 | A | 5/1997 | Manabe et al. |
| 5,751,243 | A * | 5/1998 | Turpin .......................... 342/179 |
| 5,892,598 | A * | 4/1999 | Asakawa et al. ............... 359/13 |
| 6,788,210 | B1 | 9/2004 | Huang et al. |
| 6,874,894 | B2 | 4/2005 | Kitamura |
| 6,977,732 | B2 | 12/2005 | Chen et al. |
| 7,353,954 | B1 * | 4/2008 | Malek ................... B07C 5/3404 198/400 |
| 7,440,590 | B1 | 10/2008 | Hassebrook et al. |
| 7,844,079 | B2 | 11/2010 | Hassebrook et al. |
| 8,224,068 | B2 | 7/2012 | Hassebrook et al. |
| 8,723,923 | B2 | 5/2014 | Bloom et al. |

(Continued)

OTHER PUBLICATIONS

Liu, K., Y. Wang, D. L. Lau, Q. Hao, and L. G. Hassebrook, Dual-frequency pattern scheme for high-speed 3-D shape measurement, vol. 18, No. 5, Optics Express 5229-5244 (Mar. 1, 2010).

(Continued)

*Primary Examiner* — Paulos M Natnael
(74) *Attorney, Agent, or Firm* — Macheledt Bales LLP

(57) ABSTRACT

A surface measurement module for 3-D image acquisition of a subject-under-inspection. The module having: (a) a casing to house a pattern shifting device having a fixed-pattern optic through which light from a light source is passed, an output of the pattern shifting device being directed at a polarizing beam splitter and the polarized output of the splitter directed through a lens assembly comprising at least one lens element; (b) a reflector to direct the polarized output exiting the lens assembly, to illuminate a surface of the subject-under-inspection; (c) a scattered light illumination off the surface is directed back through the lens assembly for capture by an image sensor; and (d) the casing also housing the polarizing beam splitter, the lens assembly, and the image sensor. The output of the fixed-pattern optic comprises a multi-frequency pattern. The pattern shifting device may be a linear or rotating type.

20 Claims, 27 Drawing Sheets

(56) References Cited

U.S. PATENT DOCUMENTS

| | | | |
|---|---|---|---|
| 8,976,367 B2* | 3/2015 | Bellis | G01B 11/2513 356/601 |
| 2002/0014577 A1* | 2/2002 | Ulrich | G01B 11/2513 250/205 |
| 2003/0039388 A1* | 2/2003 | Ulrich | G01B 11/2513 382/145 |
| 2004/0090638 A1 | 5/2004 | Babayoff et al. | |
| 2006/0132790 A1* | 6/2006 | Gutin | 356/479 |
| 2007/0086762 A1 | 4/2007 | O'Keefe et al. | |
| 2009/0226049 A1* | 9/2009 | Debevec et al. | 382/118 |
| 2010/0195114 A1* | 8/2010 | Mitsumoto et al. | 356/601 |
| 2010/0321773 A1 | 12/2010 | Chen et al. | |
| 2011/0242281 A1 | 10/2011 | Schmidt | |
| 2012/0092461 A1 | 4/2012 | Fisker et al. | |
| 2012/0092463 A1* | 4/2012 | Liu et al. | 348/50 |
| 2012/0113229 A1 | 5/2012 | Hassebrook et al. | |
| 2012/0120412 A1* | 5/2012 | Bellis | G01B 11/2545 356/603 |
| 2012/0120413 A1 | 5/2012 | Bellis et al. | |
| 2012/0262573 A1* | 10/2012 | Bridges | 348/135 |
| 2012/0265479 A1* | 10/2012 | Bridges | 702/135 |

OTHER PUBLICATIONS

Wang, Y, K. Liu, D. L. Lau, and L. G. Hassebrook, Period Coded Phase Measuring Strategy for 3-D Realtime Acquistion and Data Processing, J. Opt. Soc. (2009).

Liu, K., Y. Wang, D. L. Lau, Q. Hao, and L. G. Hassebrook, LUT-based processing for structured light illumination real-time phase and 3-D surface reconstruction, J. Opt. Soc. (2009).

Li, Jielin, Hassebrook, L. G., and Guan, C., "Optimized two-frequency phase-measuringprofilometry light-sensor temporal-noise sensitivity," J. Opt. Soc Am. A, vol. 20, No. 1. pp. 106-115 (Jan. 2003).

Frisken, S. F., R. N. Perry, A. P. Rockwood, and T. R. Jones, "Adaptively sampled distance fields: A general representation of shape for computer graphics," in Proceedings of the 27th annual conference on Computer graphics and interactive techniques, 249-254 (2000).

* cited by examiner

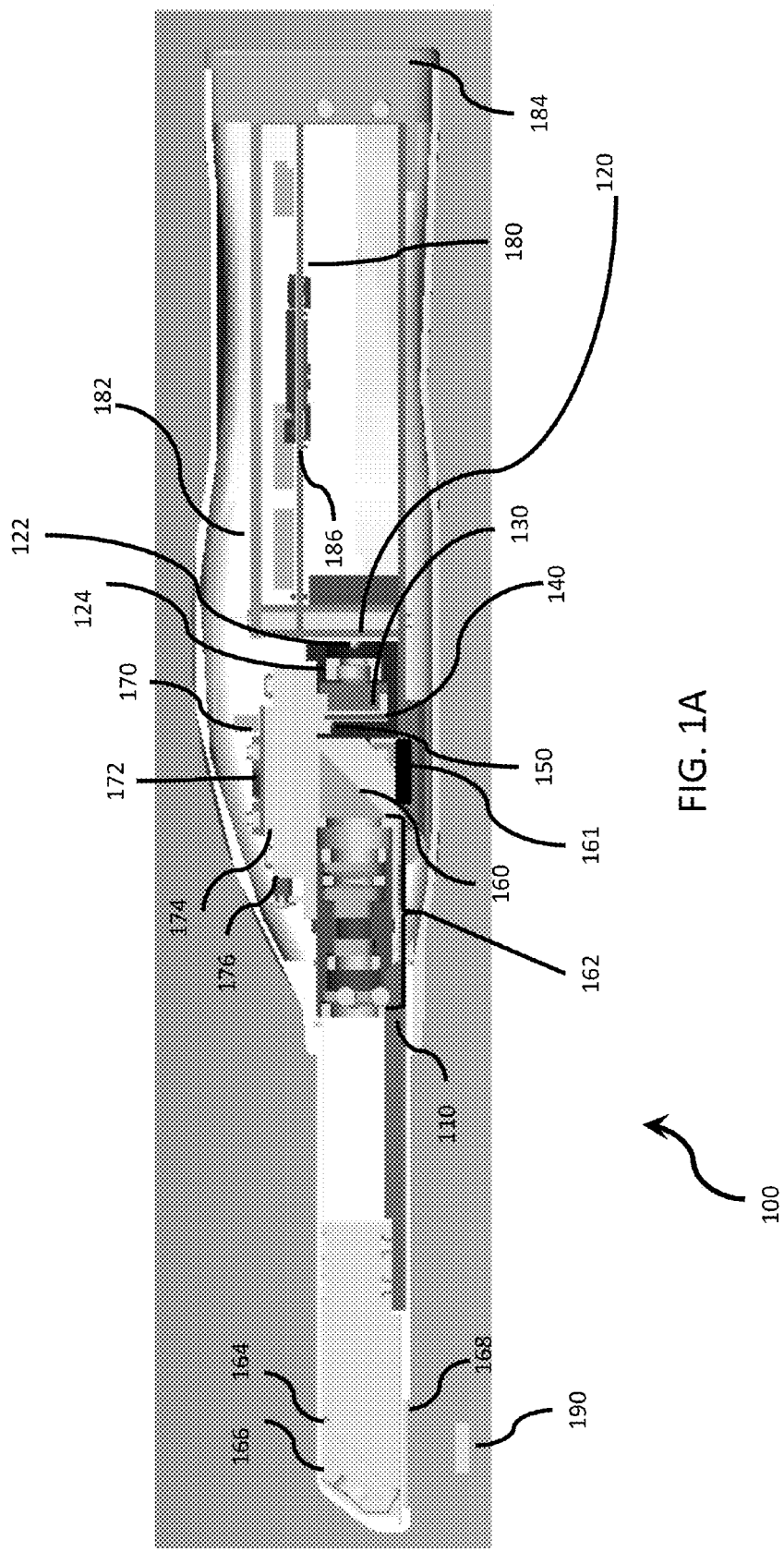

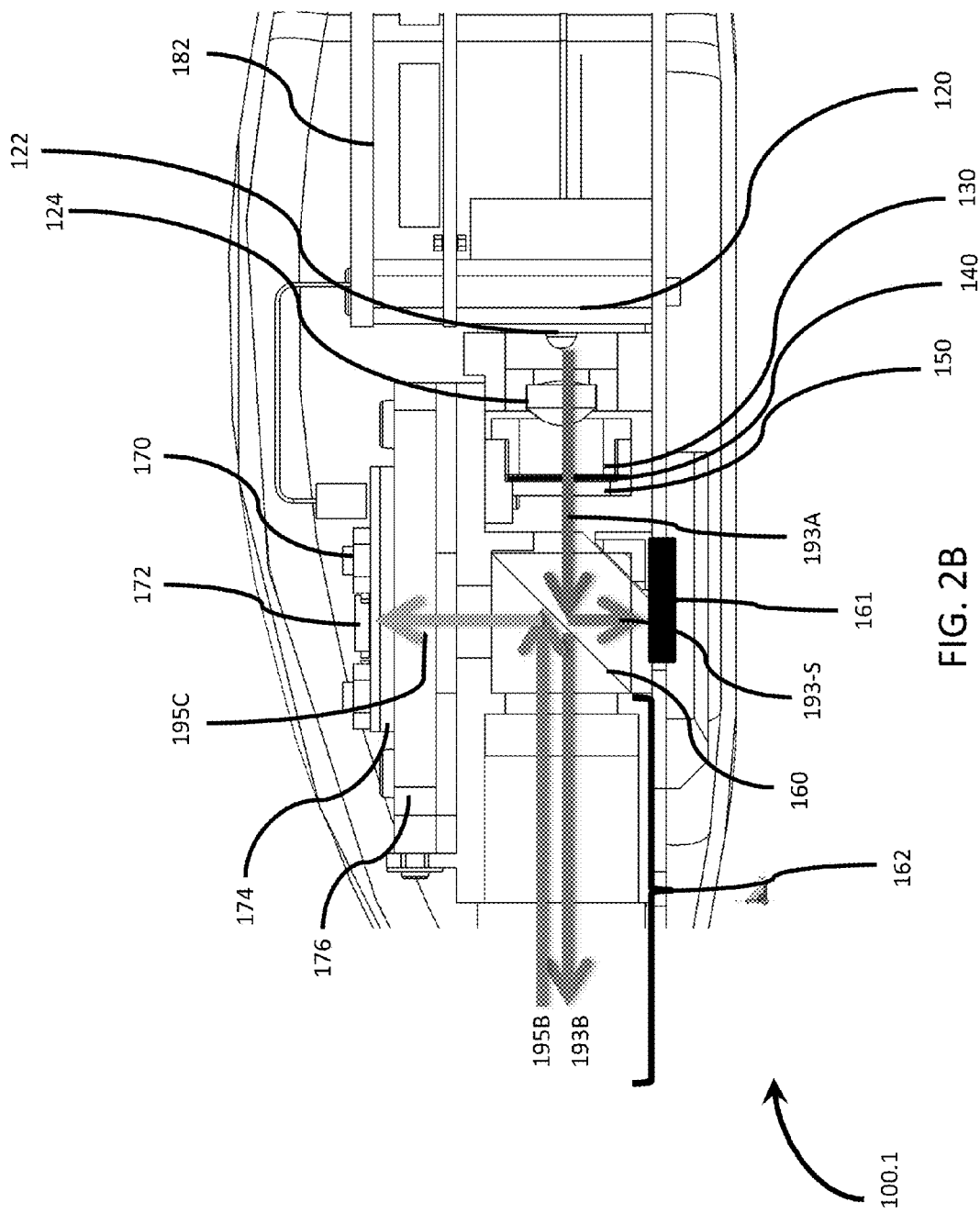

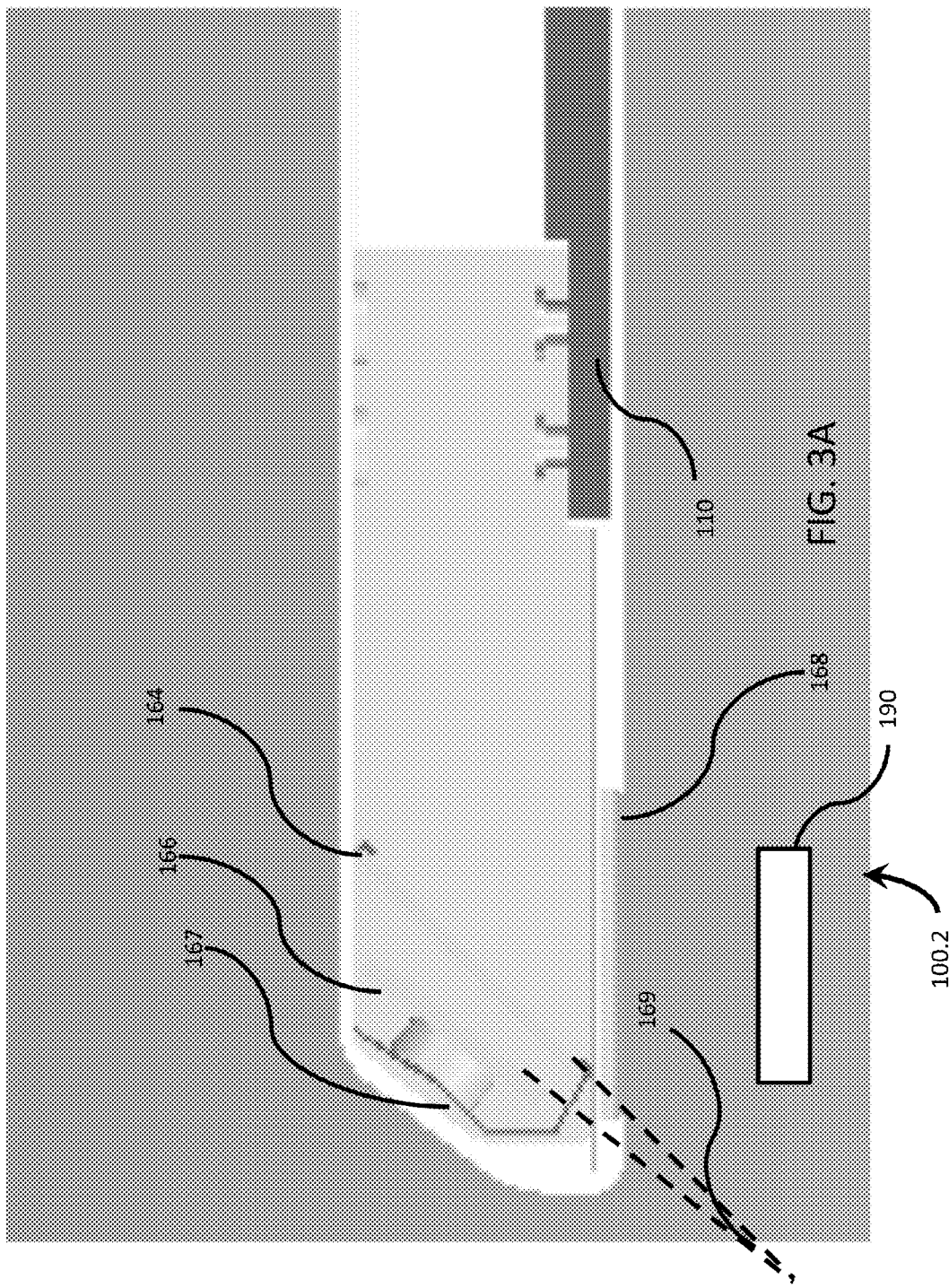

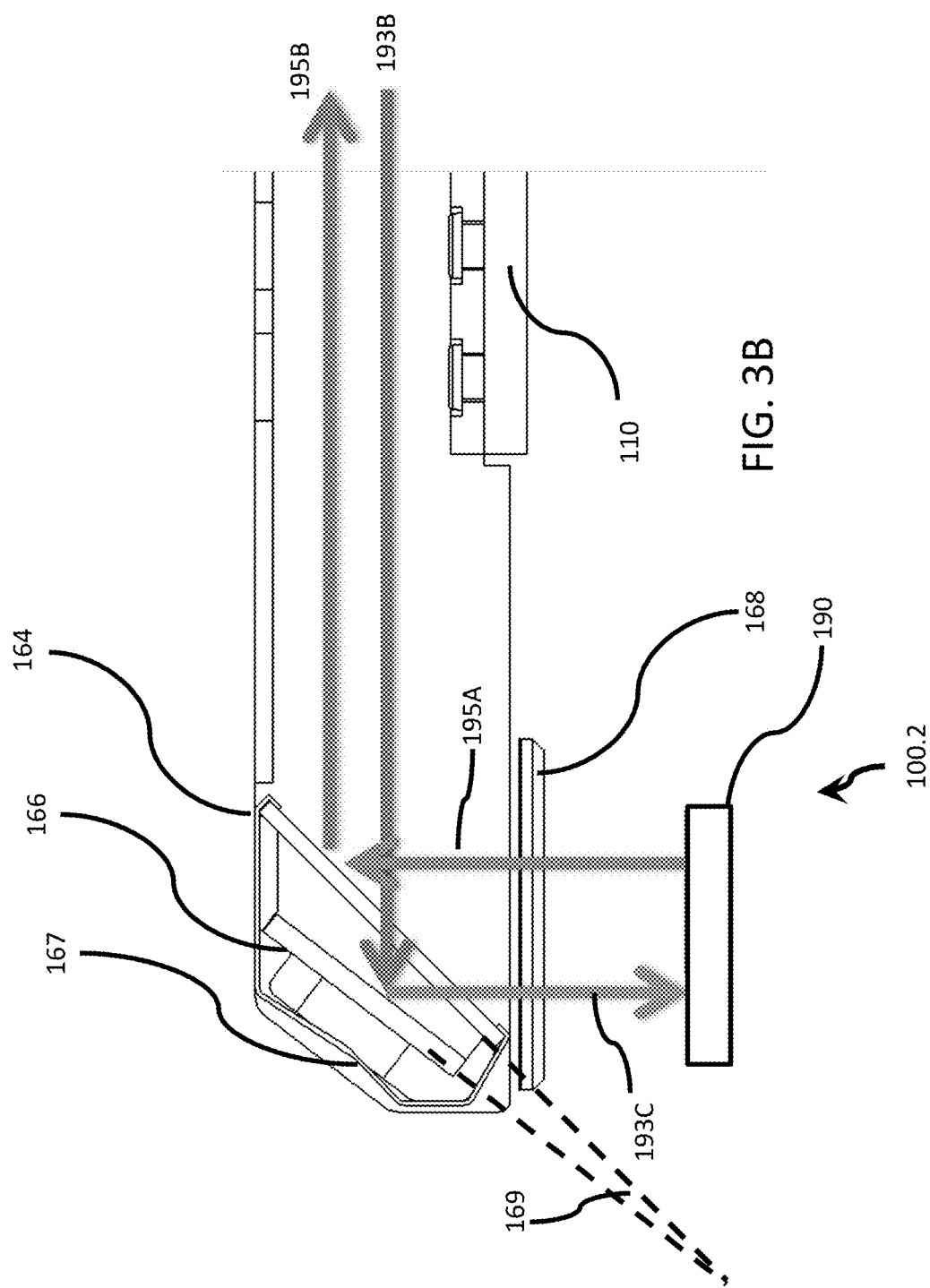

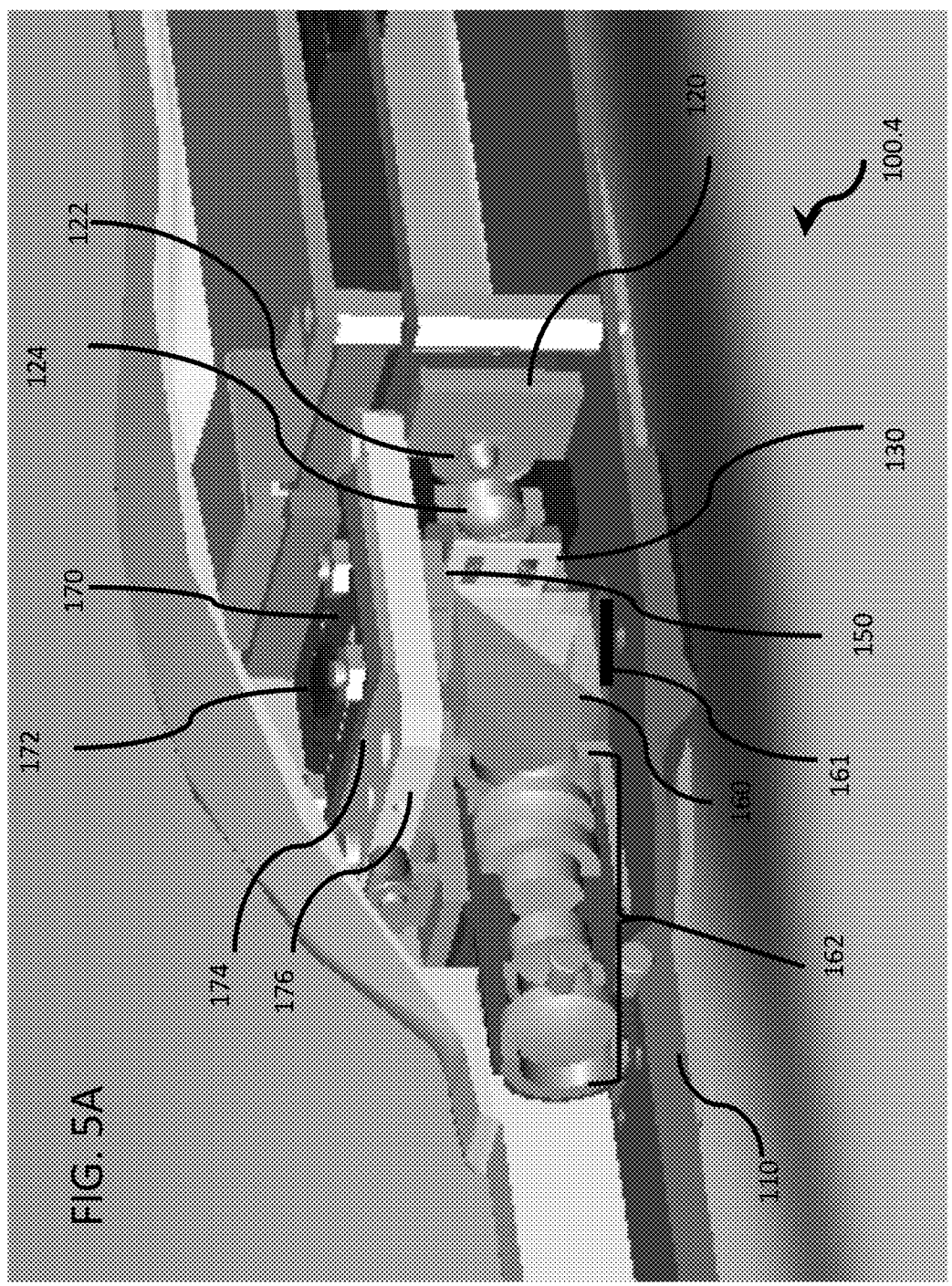

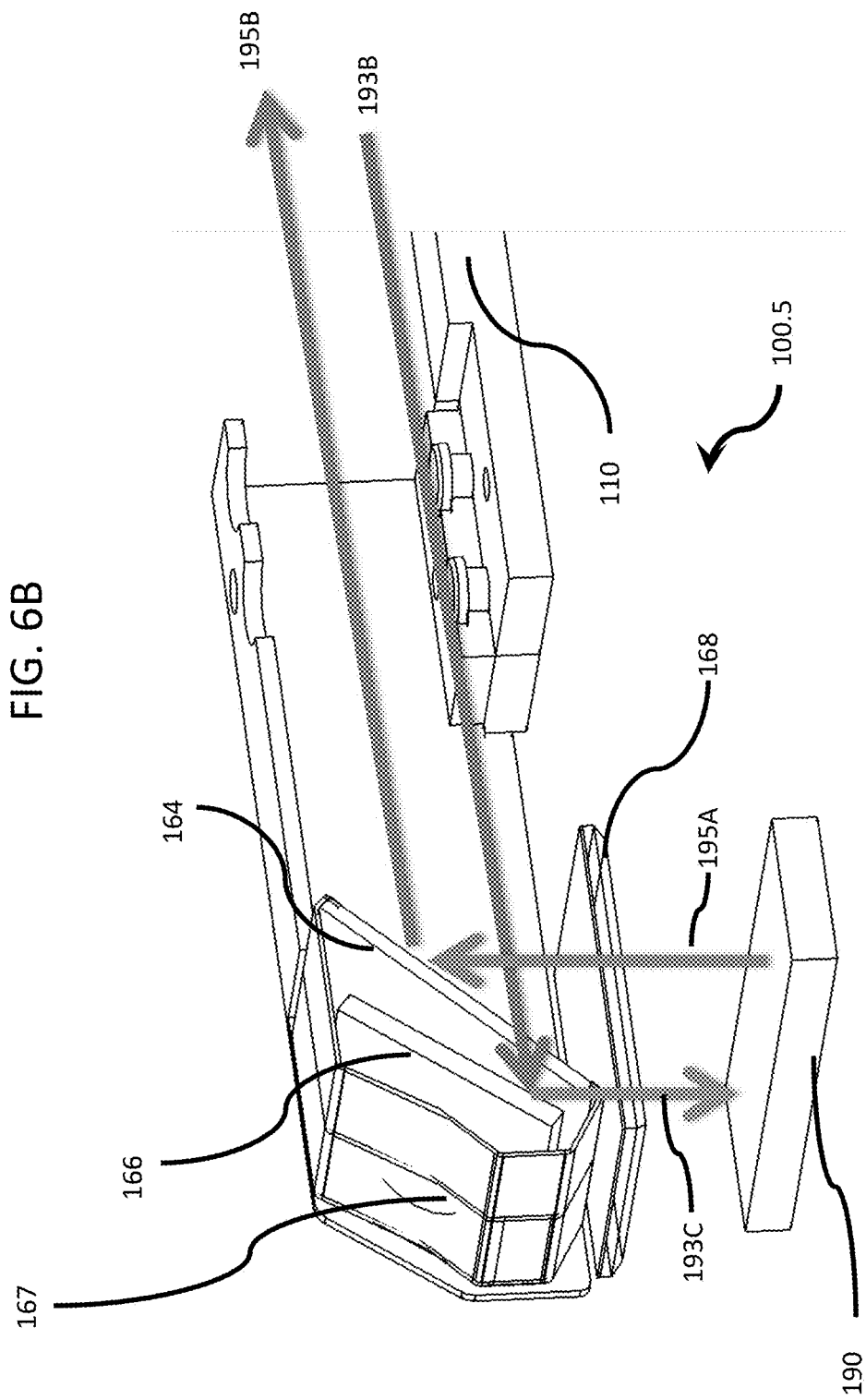

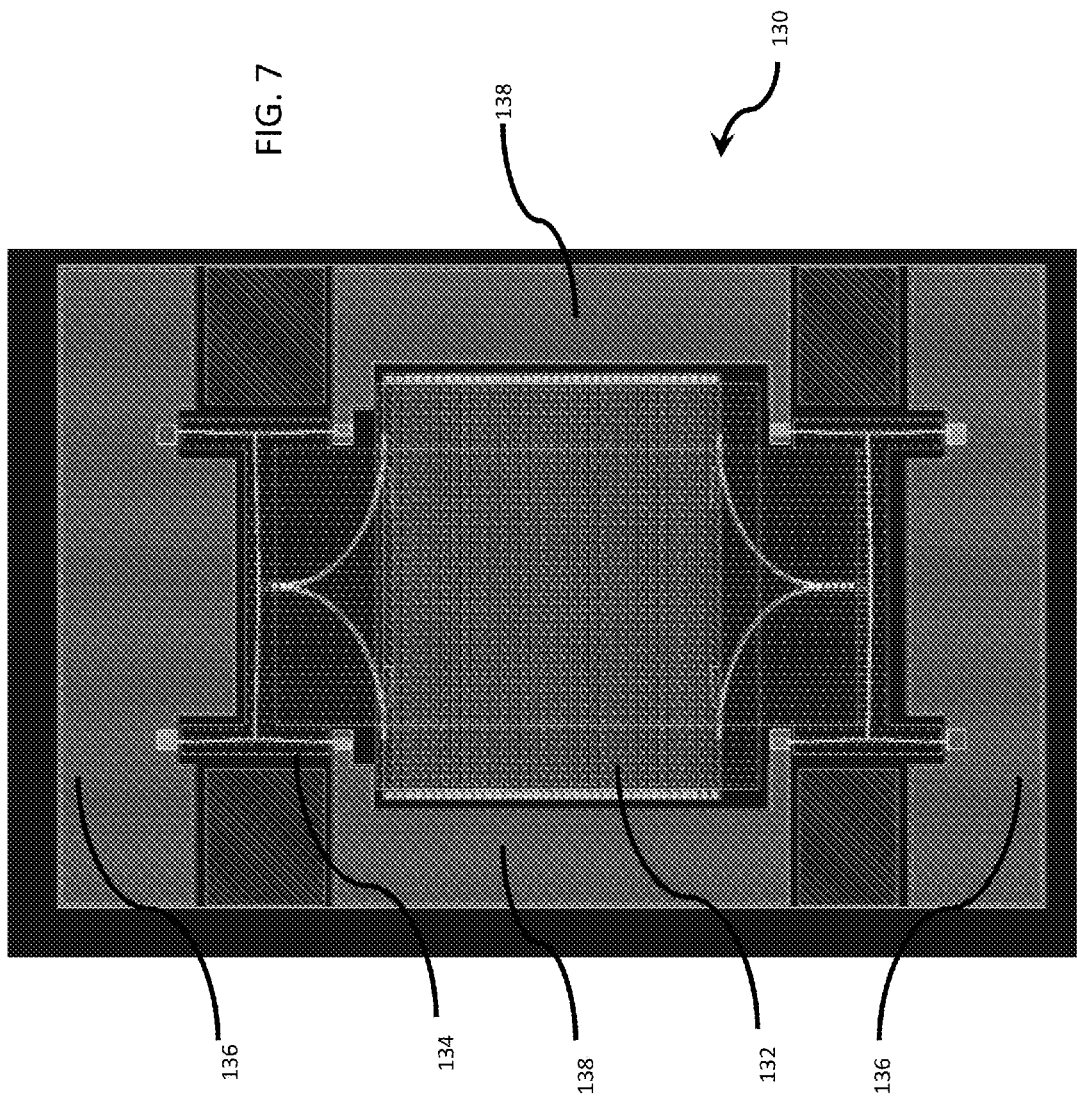

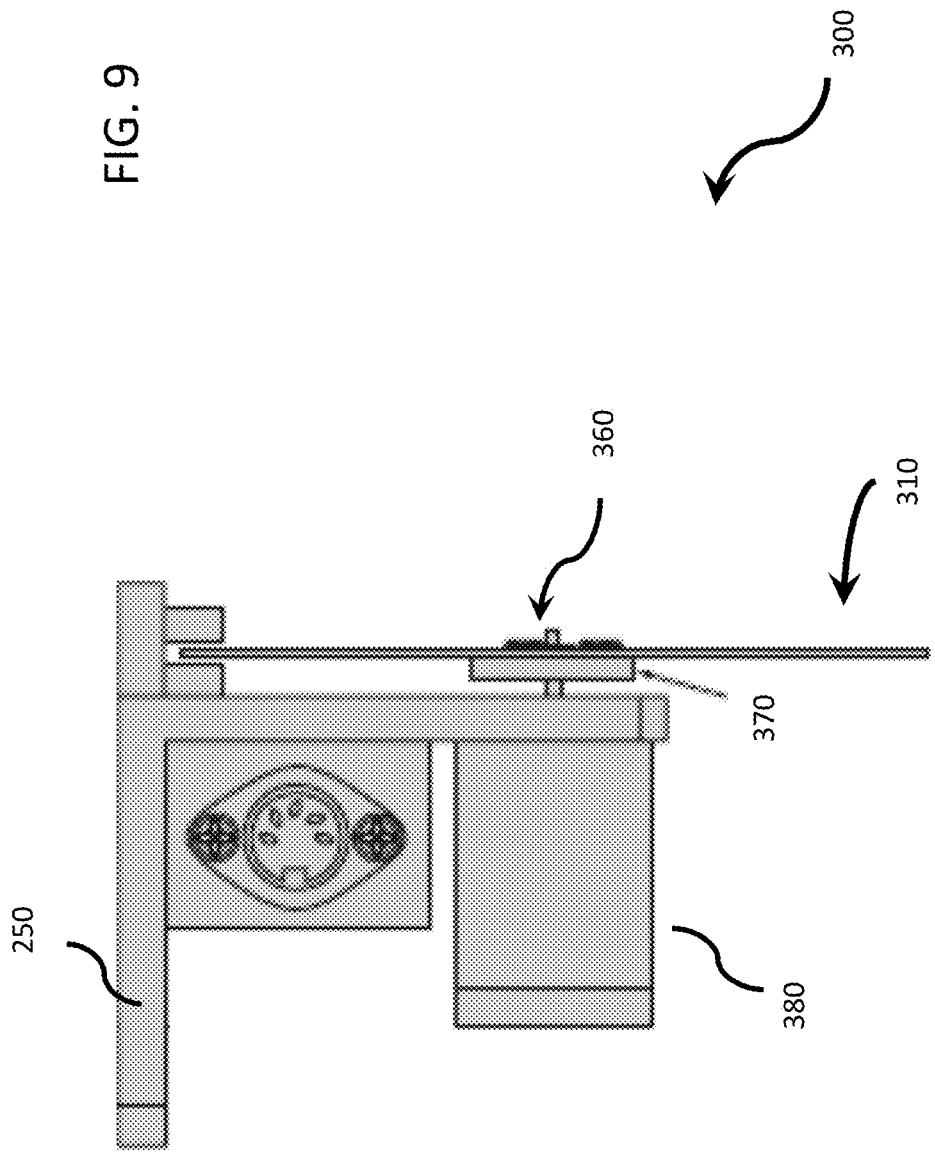

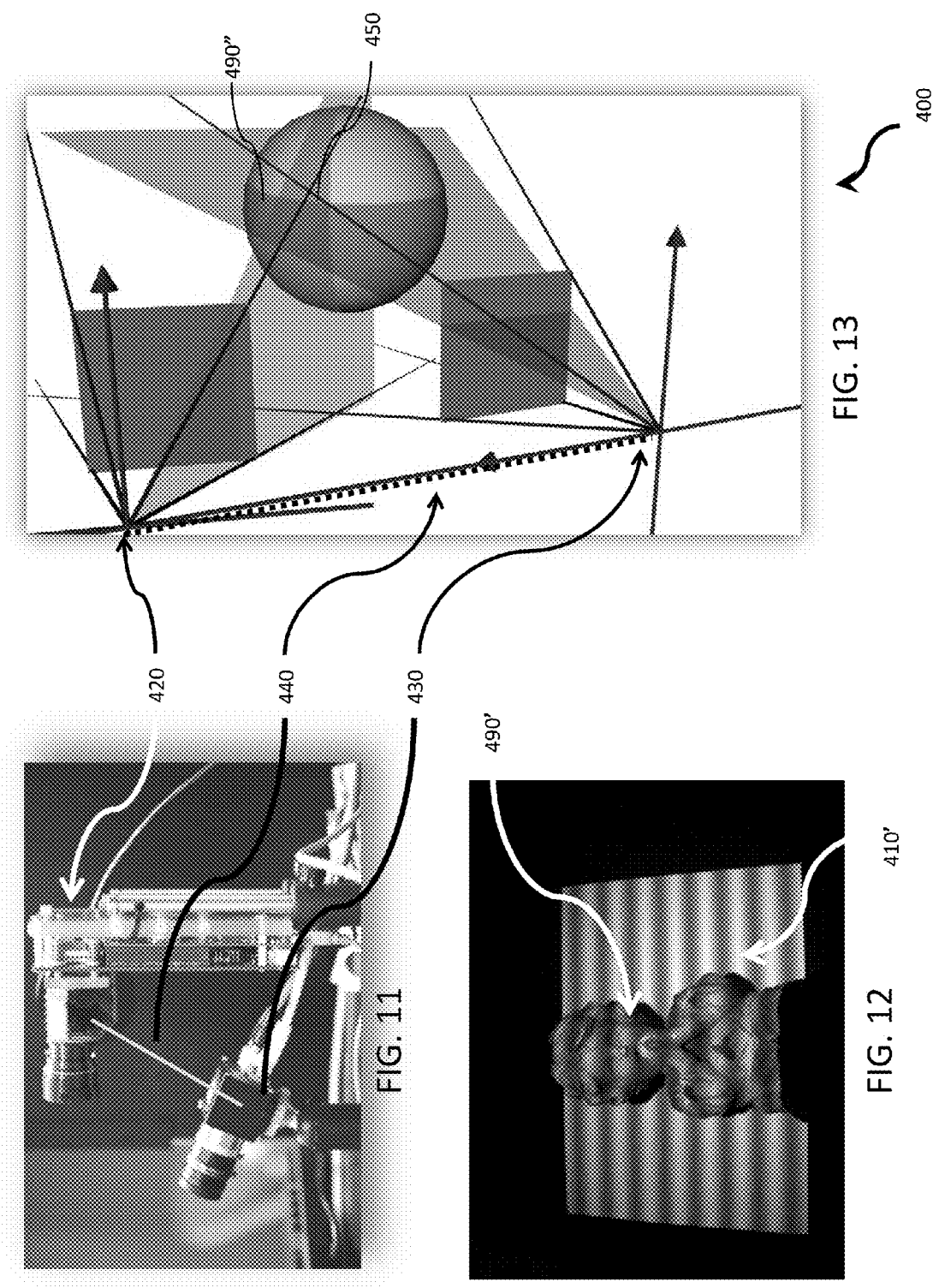

410.2

$$I_n^P(x^P, y^P) = A^P(x^P, y^P) + B^P(x^P, y^P)\cos\left(2\pi f y^P - \frac{2\pi n}{N}\right) \quad \text{— 510}$$

$$I_n^C(x^C, y^C) = A^C(x^C, y^C) + B^C(x^C, y^C)\cos\left(\phi(x^C, y^C) - \frac{2\pi n}{N}\right) \quad \text{— 520}$$

$$\phi = \tan^{-1}\left[\frac{\sum_{n=0}^{N-1} I_n^C \sin\left(\frac{2\pi n}{N}\right)}{\sum_{n=0}^{N-1} I_n^C \cos\left(\frac{2\pi n}{N}\right)}\right] \quad \text{— 530}$$

$$\phi(x^C, y^C) = 2\pi f y^P \quad \text{— 540}$$

$$\begin{pmatrix} m_{11}^C - m_{31}^C x^C, & m_{12}^C - m_{32}^C x^C, & m_{13}^C - m_{33}^C x^C \\ m_{21}^C - m_{31}^C y^C, & m_{22}^C - m_{32}^C y^C, & m_{23}^C - m_{33}^C y^C \\ m_{21}^P - m_{31}^P y^P, & m_{22}^P - m_{32}^P y^P, & m_{23}^P - m_{33}^P y^P \end{pmatrix}^{-1} \begin{pmatrix} m_{14}^C - m_{34}^C x^C \\ m_{24}^C - m_{34}^C y^C \\ m_{24}^P - m_{34}^P y^P \end{pmatrix} \quad \text{— 550}$$

$$\begin{pmatrix} X^W \\ Y^W \\ Z^W \end{pmatrix} =$$

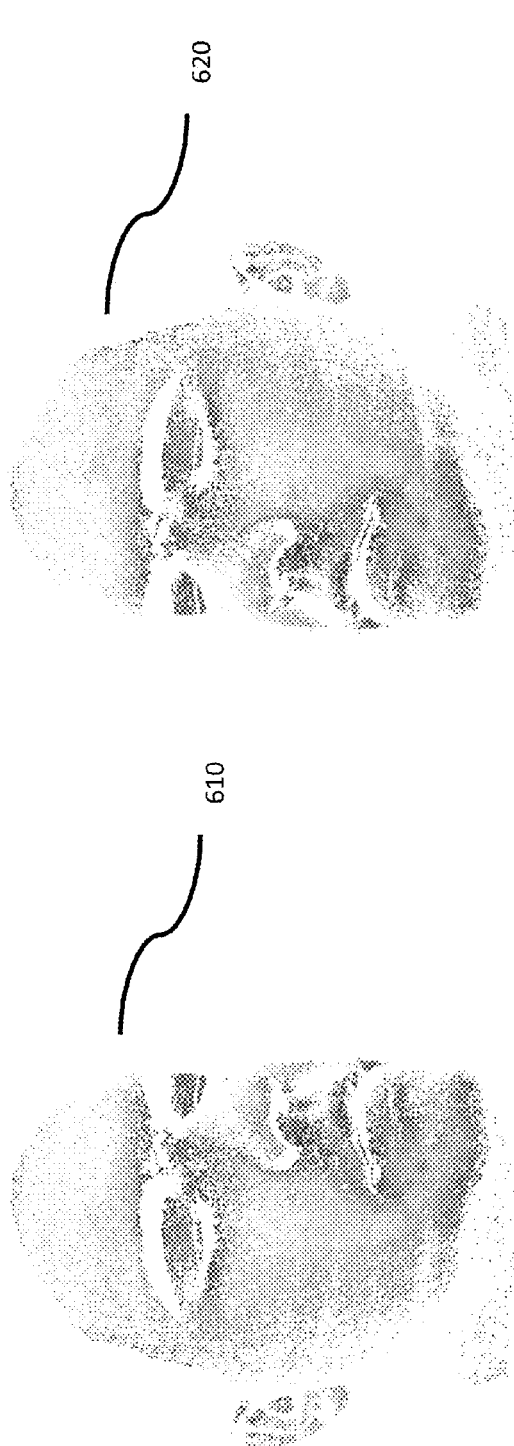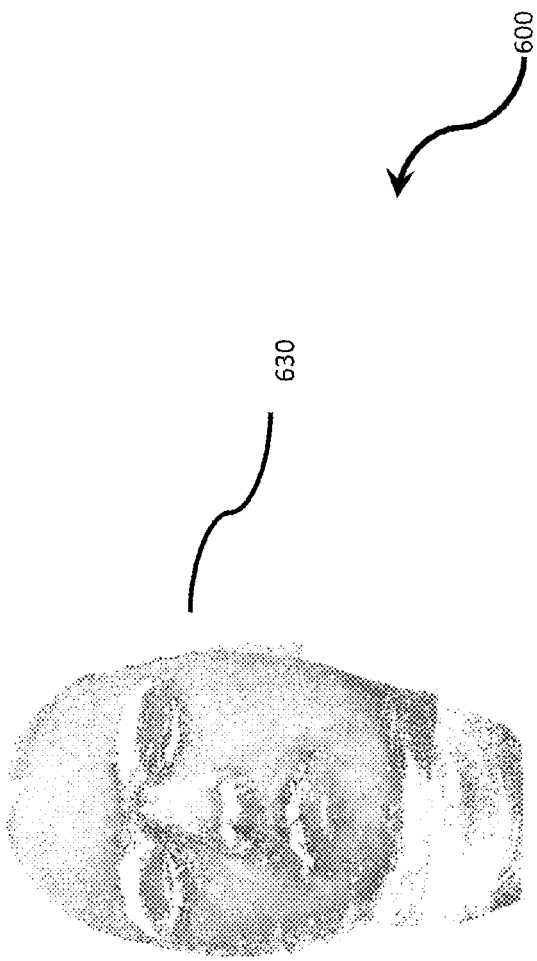
FIG. 16A
FIG. 16B
FIG. 16C

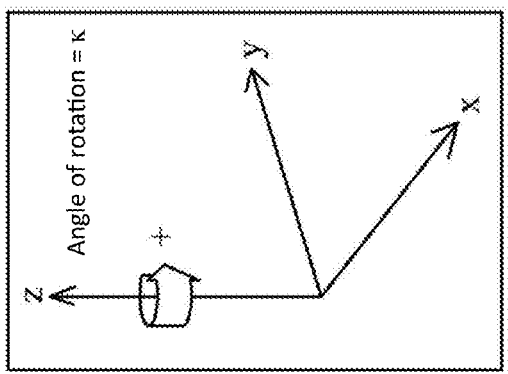

FIG. 17A

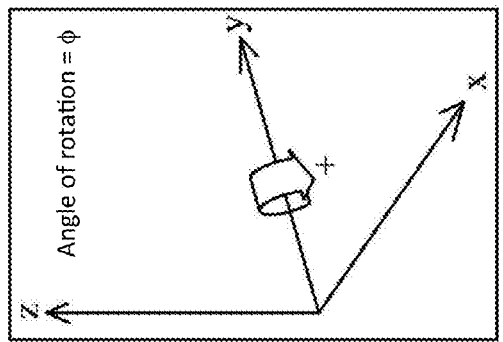

FIG. 17B

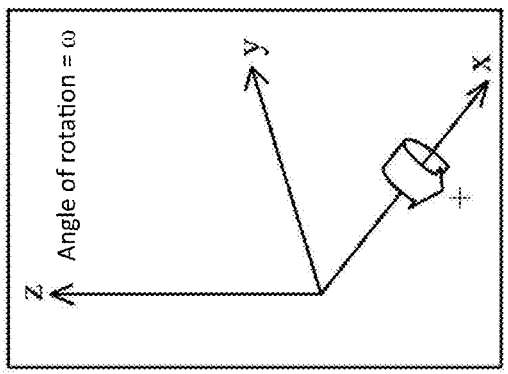

FIG. 17C $$R = \begin{bmatrix} \cos\phi\cos\kappa & \cos\omega\sin\kappa + \sin\omega\sin\phi\cos\kappa & \sin\omega\sin\kappa - \cos\omega\sin\phi\cos\kappa \\ -\cos\phi\sin\kappa & \cos\omega\cos\kappa - \sin\omega\sin\phi\sin\kappa & \sin\omega\cos\kappa + \cos\omega\sin\phi\sin\kappa \\ \sin\phi & -\sin\omega\cos\phi & \cos\omega\cos\phi \end{bmatrix}$$

$$\begin{bmatrix} x' \\ y' \\ z' \end{bmatrix} = R \begin{bmatrix} x \\ y \\ z \end{bmatrix}$$

$R_{11} = \cos\phi\cos\kappa$
$R_{12} = \cos\omega\sin\kappa + \sin\omega\cos\kappa\sin\phi$
$R_{13} = \sin\omega\cos\kappa - \cos\omega\sin\kappa\sin\phi$
$R_{21} = -\cos\phi\sin\kappa$
$R_{22} = \cos\omega\cos\kappa - \sin\omega\sin\kappa\sin\phi$
$R_{23} = \sin\omega\cos\kappa + \cos\omega\sin\kappa\sin\phi$
$R_{31} = \sin\phi$
$R_{32} = -\sin\omega\cos\phi$
$R_{33} = \cos\omega\cos\phi$

FIG. 17D

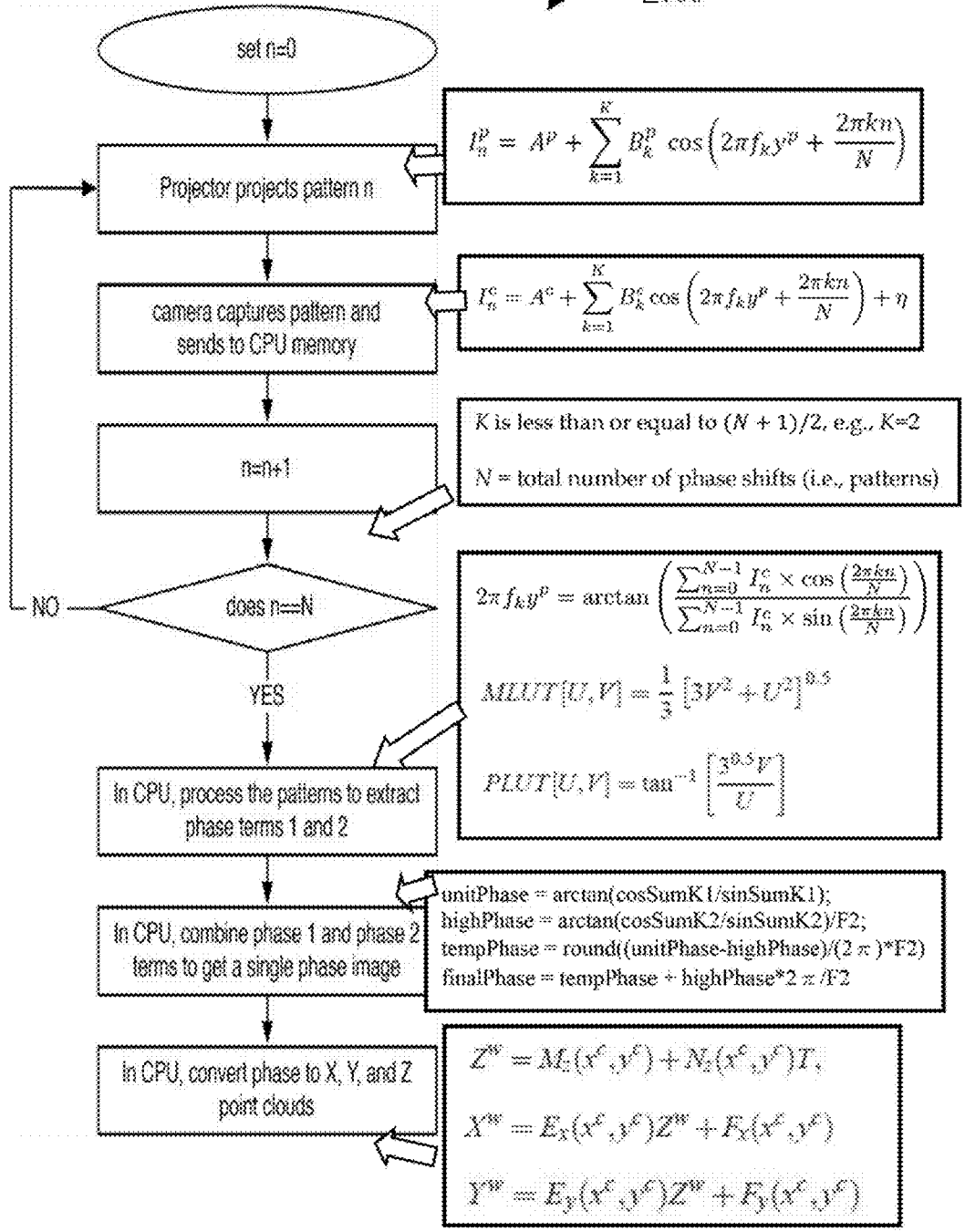

PORTABLE STRUCTURED LIGHT MEASUREMENT MODULE/APPARATUS WITH PATTERN SHIFTING DEVICE INCORPORATING A FIXED-PATTERN OPTIC FOR ILLUMINATING A SUBJECT-UNDER-TEST

CROSS REFERENCE TO RELATED APPLICATIONS

This application claims benefit under 35 U.S.C. 119(e) of U.S. Provisional Application No. 61/511,971 filed 26 Jul. 2011 by the applicants on behalf of the assignee, the complete disclosure of which is incorporated herein by reference, to the extent the disclosure provides support and further edification hereof.

FIELD OF THE INVENTION

In general, the invention relates to the field of three-dimensional (3-D) measurement of surfaces using structured light illumination (SLI) techniques. As used, "SLI" represents the term Structured Light Illumination, or often simply, Structured Light. More-particularly, the invention is directed to a new portable module/apparatus and associated optical technique to measure and record the characteristics of a 3-D surface of an object-under-test/subject-under-inspection. The module employs a light source out of which light is directed along a pathway through a linear or rotating pattern shifting device comprising a fixed-pattern optic from which a superimposed/overlaid SLI pattern emerges as a selected superimposed SLI pattern composed of a plurality of SLI patterns. The novel SLI pattern that emerges from the linear pattern shifting device is directed through a polarizing beam splitter, the polarized light being then directed on through a lens assembly which, in operation, is uniquely structured to assist with both projection of the SLI pattern and camera functionalities. The polarized, projected SLI pattern light then travels on, to be redirected (by reflection, for example) to illuminate the 3-D surface of interest of the area/object-under-test or subject-under-investigation.

Further unique to the design of the module/apparatus is that light reflected off an illuminated 3-D surface of interest (whether translucent in nature with sub-surfaces, such as is the case of a mammalian tooth under inspection) is directed back into the module, and further redirected back through the lens assembly (preferably comprising a plurality of lens elements). This return light, having been redirected back through the unique lens assembly, exits same, then is directed into a camera image sensor. The digital SLI image information captured by the image sensor contains information of the characteristics of the 3-D surface of interest for conventional processing and storage.

The module/apparatus and associated technique of the invention may be used to inspect a wide variety of areas-of-interest of 3-D objects/subjects. While represented herein as a portable device adapted for operation by-hand, one will appreciate the novel components may be downsized for use in areas/interiors requiring a smaller, or miniature module, or may be sized larger to collect information about 3-D areas of interest covering much greater area. Such areas-of-interest include: those within a mammalian oral cavity when investigating dental health or an area of skin or tissue; or to characterize the interior of a pipeline (taking measurements from within the pipeline-under-test); or inspect 3-D surfaces of semiconductor wafers undergoing fabrication; or to inspect printed circuit/wiring board (PCB/PWB); and other such surface inspection of goods or products-of-manufacture (parts, assemblies, foodstuff, packaging).

Additional background information and technical support can be found in U.S. patent application Ser. No. 13/297,233, published as US2012/0120412 A1 on 17 May 2012 and Ser. No. 13/297,246, published as US2012/0120413 A1 on 17 May 2012, thereafter granted as U.S. Pat. No. 8,976,367 on 10 Mar. 2015—owned and filed on behalf of the assignee, hereof—pending at the time the instant utility patent application was filed. Both U.S. patent application Ser. No. 13/297,233 (published as US2012/0120412) and Ser. No. 13/297,246 (published as US2012/0120413) were filed on 15 Nov. 2011 by two of the three applicant-inventors of the instant utility patent application.

BACKGROUND OF THE INVENTION

Historical Perspective

The object measurement technique referred to as Structured Light (or, SLI) has been in use for measuring the 3-D characteristics of objects for many years. However, current implementations are computationally heavy and available systems have large footprints. Because conventional SLI surface measuring systems employ sophisticated electronically-driven SLI signal processing projection units to project SLI patterns—with each SLI pattern projected requiring a dedicated projector unit—it has been impractical to employ conventional SLI surface measuring systems to perform real-time measurements to monitor surfaces located in relatively small spaces (volumes), such as, surfaces located: inside the mouth or ear of a mammal (intra-oral and intra-aural surfaces), inside machinery (for example, machinery found in manufacturing plants); within a pipeline, and so on. Furthermore, the nature of projecting multiple sophisticated SLI patterns requisite for making 3-D surface measurements—where each conventional SLI pattern projected requires a dedicated projector unit—has further led way from the application of conventional SLI surface measuring systems to make real-time measurements of 3-D surfaces.

Structured Light (i.e., Structured Light Illumination), confocal imaging, time-of-flight, and parallel confocal microscopy are each considered 3-D measurement techniques. SLI is currently used to observe a surface-of-interest by projecting multiple SLI patterns (grid, stripes, elliptical patterns, and so on) with a projector onto a surface-of-interest while measuring, with a camera (lens and processing unit) the image reflected off the surface-of-interest to deduce resultant distortions of the patterns produced on the surface-of-interest. Knowing camera and projector geometry (many conventional techniques exists for such mapping), point-by-point depth information about the surface distortions is calculated by way of triangulation. World coordinates to camera are calculated using conventional well known mapping techniques such as that found at vision.caltech.edu/bouguetj/calib_doc/: "This toolbox works on Matlab 5.x, Matlab 6.x and Matlab 7.x on Windows, Unix and Linux systems and does not require any specific Matlab toolbox (for example, the optimization toolbox is not required)." Using the conventional camera calibration toolbox for Matlab, one computes the necessary coefficients to map world coordinates onto the coordinate system of the camera and the projector. In this manner, a mathematical relationship is defined between the camera (i.e., each individual pixel in the camera), the projector, (i.e., the origin of projected rows of information), and an object-under-test located in an external frame of reference, often referred to as the 'real world' coordinate system.

U.S. Pat. No. 6,788,210 entitled "METHOD AND APPARATUS FOR THREE DIMENSIONAL SURFACE CONTOURING AND RANGING USING A DIGITAL VIDEO PROJECTION SYSTEM," uses a complex series of interconnected dedicated projector units engaged to generate a desired projected multi-pattern image on a surface of interest; FIG. 5 from U.S. Pat. No. 6,788,210 illustrates one conventional optical configuration for a projection system. U.S. Pat. No. 5,633,755 provides additional detail regarding the configuration of an optical system and its electronic control system. U.S. Pat. No. 6,874,894 B2 entitled "DMD EQUIPPED PROJECTOR" details a system known as "Texas Instruments DMD" projector, i.e., the 'DLP device' of a projection apparatus.

As one can appreciate, the system depicted in FIG. 5 from U.S. Pat. No. 6,788,210 and the system depicted in FIG. 5 of U.S. Pat. No. 6,874,894 are structurally and functionally the same. As explained in U.S. Pat. No. 6,788,210, to generate an image, component 46 is used. This component has been labeled 113 in FIG. 6 of U.S. Pat. No. 6,874,894 B2 as PRIOR ART. The Texas Instruments DMD, also known as the DMD or the DLP device, is an complicated semiconductor device, specifically referred to as an optical MEMS device. The DMD is further detailed in Hornbeck, Larry J., "*Digital Light Processing for High-Brightness, High-Resolution Applications*," SPIE Vol. 3013 pps. 27-40; by way of background only, the content found on the Internet at the domain dlp.com.

U.S. Pat. No. 6,977,732 describes an application of the DMD to measure the three dimensional shape of small objects. As explained therein, additional complex electronic systems are needed to operate the DMD-based projection system: It has an electronic micro-display for three dimensional measurements. Seiko-Epson manufactures liquid crystal devices for projection applications. Sony, Omnivision, and JVC each manufacture liquid crystal on silicon devices for projection applications. Like the DMD, conventional devices are electronically-controlled so that projection of light patterns requires complicated optical control electronics and optics structures.

Computerized Devices, Memory and Storage Devices/Media

I. Digital Computers.

A processor is the set of logic devices/circuitry that responds to and processes instructions to drive a computerized device. The central processing unit (CPU) is considered the computing part of a digital or other type of computerized system. Often referred to simply as a processor, a CPU is made up of the control unit, program sequencer, and an arithmetic logic unit (ALU)—a high-speed circuit that does calculating and comparing. Numbers are transferred from memory into the ALU for calculation, and the results are sent back into memory. Alphanumeric data is sent from memory into the ALU for comparing. The CPUs of a computer may be contained on a single 'chip', often referred to as microprocessors because of their tiny physical size. As is well known, the basic elements of a simple computer include a CPU, clock and main memory; whereas a complete computer system requires the addition of control units, input, output and storage devices, as well as an operating system. The tiny devices referred to as 'microprocessors' typically contain the processing components of a CPU as integrated circuitry, along with associated bus interface. A microcontroller typically incorporates one or more microprocessor, memory, and I/O circuits as an integrated circuit (IC). Computer instruction(s) are used to trigger computations carried out by the CPU.

II. Computer Memory and Computer Readable Storage.

While the word 'memory' has historically referred to that which is stored temporarily, with storage traditionally used to refer to a semi-permanent or permanent holding place for digital data—such as that entered by a user for holding long term—however, the definitions of these terms have blurred. A non-exhaustive listing of well known computer readable storage device technologies compatible with a variety of computer processing structures are categorized here for reference: (1) magnetic tape technologies; (2) magnetic disk technologies include floppy disk/diskettes, fixed hard disks (often in desktops, laptops, workstations, host computers and mainframes interconnected to create a 'cloud' environment, etc.), (3) solid-state disk (SSD) technology including DRAM and 'flash memory'; and (4) optical disk technology, including magneto-optical disks, PD, CD-ROM, CD-R, CD-RW, DVD-ROM, DVD-R, DVD-RAM, WORM, OROM, holographic, solid state optical disk technology, etc.

BACKGROUND OF THE INVENTION

Use of Multi-Frequency Patterns

The instant new technique and system disclosed herein, leverage the unique technique disclosed in U.S. Provisional Patent Application 61/371,626, Liu et al., filed 6 Aug. 2010 entitled "Dual-frequency Phase Multiplexing (DFPM) and Period Coded Phase Measuring (PCPM) pattern strategies in 3-D structured light systems, and Lookup Table (LUT) based real-time data processing for phase measuring pattern strategies," ("Prov App '626") fully incorporated herein by reference for its technical background discussion. U.S. utility application Ser. No. 13/205,607, Liu et al., granted 3 Feb. 2015 as U.S. Pat. No. 8,947,677 B2, filed 8 Aug. 2011 ("Util App '607") was granted priority to Liu et al.'s Prov App '626: the technical disclosures of both Prov App '626 and Util App '607 are hereby fully incorporated herein by reference to the extent consistent with the instant technical specification. Please note that neither Prov App '626 or Util App '607 is commonly owned by the assignee of the instant utility patent application or the pending provisional app to which the instant utility patent application has claimed priority, namely, U.S. Provisional App. 61/511,971. The unique SLI patterning technique disclosed in Prov App '626 and Util App '607 (U.S. Pat. No. 8,947,677) comprises:

(1) a unique pattern strategy component (further detailed in technical discussions found in Prov App '626 as labeled Section A. "Dual-frequency pattern scheme for high-speed 3-D shape measurement" and as labeled Section B. "Period Coded Phase Measuring Strategy for 3-D Realtime Acquisition and Data Processing"—each of these Sections A. and B. covers an example of a new multi-frequency pattern introduced by way of analogy to the following two traditional electrical circuitry signal/current propagation types: AC, alternating current, and DC, direct current, as further explained below); and (2) a unique de-codification image processing component (further detailed in the technical discussion of Prov App '626 and labeled Section C. "LUT-based processing for structured light illumination real-time phase and 3-D surface reconstruction").

As noted above and detailed further in Prov App '626 and Util App '607, the two examples set forth in Sections A. and B. of the new multi-frequency patterns disclosed in Prov App '626 were introduced in terms of analogies to traditional electrical circuitry signal/current propagation types: An AC flavor and DC flavor. These same Sections A. and B. were integrated into, as named, applicants' pending Prov App No. 61/511,971, incorporated herein by reference as noted above. The multi-frequency pattern detailed in Section A. fashioned after principals governing AC electrical systems was coined "Dual-frequency Phase Multiplexing" (DFPM). As noted in applicants' pending U.S. Provisional App. 61/511,971, the material in Section A. was earlier published as 1 Mar. 2010/Vol. 18, No. 5/Optics Express 5233 and is noted in the section of Util App '607 labeled EXAMPLE 01. The multi-frequency pattern detailed in Section B. fashioned after principals governing DC electrical systems was coined "Period Coded Phase Measuring" (PCPM). Dual-frequency Phase Multiplexing (DFPM) patterns comprise two superimposed sinusoids, one a unit-frequency phase sine wave and the other a high-frequency phase sine wave, whereby after receiving/acquiring the pattern data by an image sensor, the phase of the two patterns is separated. The unit-frequency phase is used to unwrap the high-frequency phase. The unwrapped high-frequency phase is then employed for 3-D reconstruction. Period Coded Phase Measuring (PCPM) patterns—fashioned after DC current propagation—are generated with the period information embedded directly into high-frequency base patterns, such that the high-frequency phase can be unwrapped temporally from the PCPM patterns.

As explained in Util App '607—the specification of which is quoted extensively below—using unique multi-frequency patterns, the '607 technique accomplishes:

- - - Beginning of Quoted Text from Util App '607 - - -

. . . 3-D triangulation-based image acquisition of a contoured surface-of-interest (or simply, "contour" or "contour-of-interest") under observation by at least one camera, by projecting onto the surface-of-interest a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \quad \text{Eq. (1.1)}$$

where $I_n^p$ is the intensity of a pixel in the projector for the $n^{th}$ projected image in a particular instant/moment in time (p, to represent projector); K is an integer representing the number of component sinusoids (e.g., K=2 for a dual-frequency sinusoid pattern, K=3 for a triple-frequency sinusoid, and so on), each component sinusoid having a distinct temporal frequency, where $K \leq (N+1)/2$. The parameter $B_k^p$ represents constants that determine the amplitude or signal strength of the component sinusoids; $A^p$ is a scalar constant used to ensure that all values of $I_n^p$ are greater than zero, 0 (that is to say, that the projector unit will not project less than 0 magnitude of light); $f_k$ is the spatial frequency of the $k^{th}$ sinusoid corresponding to temporal frequency k; and $y^p$ represents a spatial coordinate in the projected image. For example, $y^p$ may represent a vertical row coordinate or a horizontal column coordinate of the projected image; n represents phase-shift index or sequence order (e.g., the n=0 pattern is first projected, and then the n=1 pattern, and so on, effectively representing a specific moment in discrete time). N is the total number of phase shifts—i.e., the total number of patterns—that are projected, and for each pattern projected, a corresponding image will be captured by the camera (or rather, the camera's image sensor). When used throughout, the superscript "c" references parameters relating to an image or series of images (video) as captured by the camera, whereas superscript "p" references the projector.

Where pixels are projected to satisfy Eq. 1.1, the pixels of the images then captured by the camera are defined according to the unique technique governed by the expression:

$$I_n^c = A^c + \sum_{k=1}^{K} B_k^c \cos\left(2\pi f_k y^p + \frac{2\pi k n}{N}\right) + \eta \quad \text{Eq. (1.2)}$$

The term $\eta$ ("eta") represents a noise due to a certain amount of error introduced into the image by the light sensor of the camera. Recall, a camera image is made up of a multitude of pixels, each pixel defined by Eq. 1.2, with values for $A^c$, $B_k^c$, and $\eta^c$ different for each pixel. The "c" superscript indicating a value is dependent on the position of the pixel as referenced in the camera sensor ('camera space'). To obtain phase terms from the pixels projected in accordance with Eq. 1.2, the unique expression, below, is carried-out for each k:

$$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right) \quad \text{Eq. (1.3)}$$

where, as before, $y^p$ represents a spatial coordinate in the projected image. In EXAMPLE 01, herein below, where K is set equal to 2, the phase terms for the cases where k=1 and k=2 (i.e., for the two superimposed sinusoids) must be determined. FIGS. 8A, 8B are reproductions of computer-generated/implemented images; FIG. 8C is FIG. 8B, enlarged to view representative stripes numbered from the top 1 through 10, by way of example. FIG. 8A is an image representing phase for the k=1 term where f=1 (unit-frequency). FIGS. 8B, 8C are reproductions of an image representing the phase term for k=2 where f=20 (i.e., the high-frequency sinusoid). Note that the stripped pattern in FIG. 5B/C has 20 stripes.

When applying the use of temporal unwrapping techniques, for the case where k=2 using Eq. 1.1, one can determine that the projected pixels will satisfy $$I_n^p = A^p + B_2^p \cos\left(2\pi f_2 y^p + \frac{2\pi 2 n}{N}\right), k = 2 \quad \text{Eq. (1.1)}$$

Where this leads to 20 stripes (as shown, for example, in FIG. 8B as a pattern projected on a human hand, the enlargement of which is labeled FIG. 8C to better view stripes), one must determine which of the 20 stripes each particular pixel falls in the projected image (e.g., FIG. 8C). Using a traditional phase unwrapping approach to determine where each pixel fell in the projected image would require a mathematical form of 'stripe counting'—which is computationally quite burdensome.

Rather, according to the instant invention, a second set of patterns (k=1) all unit-frequency sinusoids (i.e., f=1) is superimposed with a high-frequency sinusoid, such as one of 20 stripes, k=2 pattern. The unit-frequency signal is defined by an adaptation of Eq. 1.1

$$I_n^p = A^p + B_1^p \cos\left(2\pi f_1 y^p + \frac{2\pi n}{N}\right), k = 1 \qquad \text{Eq. (1.1)}$$

Therefore, rather than projecting a total of N patterns onto the contoured surface-of-interest, there are now 2*N patterns projected (such that K=2 and each pixel projected from the projector is comprised of a dual-frequency pattern, one is a unit-frequency sinusoid and the second is a high-frequency sinusoid). However, very unique to the applicants' technique according to the invention, the plurality of pixels projected using Eq. 1.1 are 'instantly decodable' such that the computerized processing unit (CPU) of the computerized device in communication with the projector and camera units, at this point already, has the data and the means to determine (closely enough) which stripe each projected pixel $I_n^p$ is in, while determining $2\pi f_2 y^p$ (i.e., phase) of the camera image (of pixel intensity, $I_n^c$), according to Eq. 1.3—reproduced again, below, for handy reference:

$$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right) \qquad \text{Eq. (1.3)}$$

To carry-out phase unwrapping of the high-frequency sinusoid the following steps can be taken:

$$unitPhase = \arctan\left(\frac{\cos\Sigma K_1}{\sin\Sigma K_1}\right)$$

$$highPhase = \arctan\left(\frac{\cos\Sigma K_2}{\sin\Sigma K_2}\right) \Big/ f_2$$

$$tempPhase = \text{round}\left(\frac{(unitPhase - highPhase)}{(2\pi)f_2}\right)$$

$$finalPhase = tempPhase + highPhase * (2\pi/f_2)$$

Or, summarized in pseudo code short-hand notation as done in FIG. 19, the above computational steps may be rewritten as:

unitPhase=arctan(cos SumK1/sin SumK1);

highPhase=arctan(cos SumK2/sin SumK2)/F2;

tempPhase=round((unitPhase−highPhase)/(2*PI) *F2);

finalPhase=tempPhase+highPhase*2*PI/F2

The first and second superimposed sinusoid may comprise, for example as noted in EXAMPLE 01, below, a unit-frequency sinusoid (in this context, 'unit' refers to having a magnitude value of 1) superimposed on a high-frequency sinusoid, the unit-frequency sinusoid and high-frequency sinusoid being projected simultaneously (i.e., effectively 'on top of one another' over a selected epoch/duration of frames, n) from a projection unit, or projector, as a plurality of pixels such that each of the pixels projected satisfy the expression $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants set such that the value of $I_n^p$ falls between a target intensity range, (e.g., between 0 and 255 for an 8-bit color depth projector), $f_h$ is the high frequency of the sine wave, $f_u$ is the 'unit' frequency of the sine wave. The unit-frequency signal/sinusoid is used during a demodulation step to produce a decodable, unwrapped-phase term temporally.

Additionally, the process includes a decoding of the projected patterns by carrying-out a lookup table (LUT)-based processing of video image data acquired by at least one image-capture device. The decoding step is performed to extract, real-time, coordinate information about the surface shape-of-interest. The LUT-based processing includes the step of implementing (or, querying) a pre-computed modulation lookup table (MLUT) to obtain a texture map for the contoured surface-of-interest and implementing (or, querying) a pre-computed phase lookup table (PLUT) to obtain corresponding phase for the video image data acquired of the contoured surface-of-interest. Furthermore, use of conventional digital image point clouds can be made to display, real-time, the data acquired.

In one aspect, the unique computer-implemented process, system, and computer-readable storage medium with executable program code and instructions, can be characterized as having two stages. The first being a dual-frequency pattern generation and projection stage, the dual-frequency pattern characterized by the expression $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants that are preferably set, by way of example, to make the value of $I_n^p$ fall between 0 and 255 for an 8-bit color depth projector, $f_h$ is the high frequency of the sine wave, $f_u$ is the unit frequency of the sine wave and equals 1, n represents phase-shift index, and N is the total number of phase shifts and is preferably greater than or equal to 5. The second stage comprises a de-codification stage employing a lookup table (LUT) method for phase, intensity/texture, and depth data.

...

By way of using lookup tables (LUT) to obtain modulation (M) and phase (P) according to $$MLUT[U, V] = \frac{1}{3}[3V^2 + U^2]^{0.5} \quad \text{and}$$

$$PLUT[U, V] = \tan^{-1}\left[\frac{3^{0.5} V}{U}\right].$$

To carry-out phase unwrapping of, for example, a high-frequency sinusoid the following steps are taken to combine phase terms to obtain a single phase image:

$$unitPhase = \arctan\left(\frac{\cos\Sigma K_1}{\sin\Sigma K_1}\right)$$

$$highPhase = \arctan\left(\frac{\cos\Sigma K_2}{\sin\Sigma K_2}\right)/f_2$$

$$tempPhase = \text{round}\left(\frac{(unitPhase - highPhase)}{(2\pi)f_2}\right)$$

$$finalPhase = tempPhase + highPhase*(2\pi/f_2)$$

Next, a conversion of phase to X, Y, Z point clouds is implemented using the following:

$$Z^w = M_z(x^c, y^c) + N_z(x^c, y^c)T,$$

$$X^w = E_x(x^c, y^c)Z^w + F_x(x^c, y^c)$$

$$Y^w = E_y(x^c, y^c)Z^w + F_y(x^c, y^c)$$

where $$E_x(x^c, y^c) = \frac{(m_{22}^c m_{33}^c - m_{23}^c m_{32}^c)x^c + (m_{13}^c m_{32}^c - m_{12}^c m_{33}^c)y^c + (m_{12}^c m_{23}^c - m_{13}^c m_{22}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

$$F_x(x^c, y^c) = \frac{(m_{22}^c m_{34}^c - m_{24}^c m_{32}^c)x^c + (m_{14}^c m_{32}^c - m_{12}^c m_{34}^c)y^c + (m_{12}^c m_{24}^c - m_{14}^c m_{22}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

$$E_y(x^c, y^c) = \frac{(m_{23}^c m_{31}^c - m_{21}^c m_{33}^c)x^c + (m_{11}^c m_{33}^c - m_{13}^c m_{31}^c)y^c + (m_{13}^c m_{21}^c - m_{11}^c m_{23}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

and $$F_y(x^c, y^c) = \frac{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)}.$$

Implementing the 7 parameters $M_z$, $N_z$, C, $E_x$, $E_y$, $F_x$, and $F_y$ by means of table lookup for indices ($x^c$, $y^c$) (camera column and row indices), reduces the total computational complexity associated with deriving the 3-D point cloud from the phase term.

- - - End of Quoted Text from Util App '607 - - -

The flow diagram labeled FIG. 19 in Util App '607 summarizes Liu et al's technique 200, as quoted extensively in the pages immediately above. By way of example, this diagram FIG. 19 from Util App '607 is incorporated and added herein and made part of the instant disclosure as FIG. 20; such that the technique referenced in Liu et al. Util App '607 at 200, is herein referenced and labeled 2100 "PRIOR ART."

The compact module of the invention—apparatus 100, 200—employs a projection system light source 122, 222 with a plurality of lens elements, and a novel linear pattern shifting device 130 (detailed in FIG. 7 having a unique fixed-pattern optic 132) from which a superimposed/overlaid SLI pattern (for example, SLI pattern 410, FIG. 14A) composed of a plurality of SLI patterns (graphically represented in FIG. 19, 910) is output to pass through a beam splitter 160 and projection-camera-lens assembly 162, and then through a second beam splitter 164 and against a mirror 166 to illuminate a surface of a 3-D object/subject-under-test (or 3-D area-under-inspection) 190, as the case may be. The pixel intensity profile pattern (such as that graphically represented in FIG. 19, 910) fixed into the fixed-patterned optic 132 (FIG. 7) can be comprised of two sinusoids at least one of which is a unit-frequency sinusoid (i.e., having a magnitude value of 1) superimposed onto a high-frequency sinusoid, such that the unit-frequency sinusoid and high-frequency sinusoid are projected simultaneously over a selected epoch/duration of frames, n, such that each of the pixels projected satisfy the expression 950, FIG. 19, and reproduced below. The expression, below, is likewise the same as that referred to as prior art eqn. (8) in Section A. of applicants' Prov App No. 61/511,971, as well as further explained in EXAMPLE 01 of Util App '607:

$$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants set such that the value of $I_n^p$ falls between a target intensity range, (e.g., between 0 and 255 for an 8-bit color depth projector), $f_h$ is the high frequency of the sine wave, $f_u$ is the 'unit' frequency of the sine wave. The unit-frequency signal/sinusoid is used during a demodulation step to produce a decodable, unwrapped-phase term temporally. Preferably, as explained in detail elsewhere herein, pixel intensity profile pattern (such as that graphically represented in FIG. 19, 910) is 'fixed' into a transparent lens member, by way of etching into, depositing onto, or otherwise 'fixing' into the lens member of a linear shifting pattern device 130, causing light entering the fixed-patterned optic 132, to exit as pattern light output (e.g., SLI pattern 410, FIG. 14A) having the desired pixel intensity profile pattern.

The unique compact measurement apparatus/module is adapted to make high-resolution measurements in real-time, leveraging off the SLI patterning technique detailed further in Prov App '626 and Util App '607 resulting in a unique portable SLI having a pattern-shifting device that incorporates a fixed-pattern optic.

SUMMARY OF THE INVENTION

One will appreciate the distinguishable features of the system and associated technique described herein from those of known 3-D shape recognition techniques, including any prior designs invented by one or more of the applicants hereof. Certain of the unique features, and further unique combinations of features—as supported and contemplated herein—may provide one or more of a variety of advantages, among which include: (a) ready integration and flexibility/versatility (i.e., use in a wide variety of environments to gather 3-D surface data about a multitude of different areas/subjects/objects-under-test); (b) single 'snap-shot' investigation of an area/subject/object-under-test and/or provide ongoing monitoring/investigation/test of an area/subject/object without disruption of the surface environment around the area/object/subject; and/or (c) speed of measurements and real-time results, particularly useful to minimize artifacts that may result from motion of an object or subject (e.g., mammal) that is in motion when surface data is measured.

BRIEF DESCRIPTION OF DRAWINGS

For purposes of illustrating the innovative nature plus the flexibility of design and versatility of the new system and associated technique, as customary, figures are included. One can readily appreciate the advantages as well as novel features that distinguish the instant invention from conventional computer-implemented tools/techniques. The figures as well as any incorporated technical materials have been included to communicate the features of applicants' innovation by way of example, only, and are in no way intended to limit the disclosure hereof.

FIGS. 1A, 1B each include cross-sectional views of a preferred portable measurement module 100 implemented according to the invention using structured light. FIG. 1A is a colorized sectional of the black and white sectional in FIG. 1B. The spatial shift of the pattern is preferably achieved by means of a linear pattern shifting device 130. In one preferred embodiment, as described, the linear pattern shifting device shifts the pattern by means of thermal actuation.

FIGS. 2A, 2B each depict enlarged, i.e., magnified, sectional views 100.1 of FIGS. 1A, 1B, respectively, highlighting the linear pattern shifting device 130, camera image sensor 172, and a portion of the optical system (as a result of enlarging, highlighting the central region of apparatus 100, features are necessarily not shown, here). The first polarizing beam splitter is shown at 160. FIG. 2A is a colorized sectional of the black and white sectional in FIG. 2B.

FIGS. 3A, 3B each depict enlarged, i.e., magnified, sectional views of the measurement tip 100.2 of apparatus 100 shown in FIGS. 1A, 1B. Highlighted here at tip 100.2, are second polarizing beam splitter 164 and a mirror 166, which cooperate to—as located—establish the triangulation angle 169 of the 3-D SLI measurement. FIG. 3A is a colorized sectional of the black and white sectional in FIG. 3B.

FIG. 4A is a colorized isometric of the black and white isometric in FIG. 4B. The spatial shift of the pattern is preferably achieved by means of a linear pattern shifting device 130. In one preferred embodiment, as described, the linear pattern shifting device shifts the pattern by means of thermal actuation.

FIGS. 5A, 5B each depict enlarged, i.e., magnified, isometric views 100.4 of FIGS. 4A, 4B, respectively, highlighting the linear pattern shifting device 130, camera image sensor 172, and a portion of the optical system (as a result of enlarging, highlighting the central region of apparatus 100, features are necessarily not shown, here). The first polarizing beam splitter is shown at 160. FIG. 5A is a colorized isometric of the black and white isometric in FIG. 5B.

FIGS. 6A, 6B each depict enlarged, i.e., magnified, sectional views of the measurement tip 100.5 of apparatus 100 shown in FIGS. 1A, 1B. Highlighted here at tip 100.5, are second polarizing beam splitter 164 and a reflector, such as mirror 166, which cooperate to—as located—establish the triangulation angle 169 of the 3-D SLI measurement. FIG. 6A is a colorized isometric of the black and white isometric in FIG. 6B.

FIG. 7 is a top plan view of the linear pattern shifting device 130. This top plan view highlights the pattern etched into the silicon plate 132, the silicon beams 134 that support and shift the device, the metal pads 136 for connecting a voltage source to the device, and the silicon frame that supports the device. Linear shifting of the device is achieved by applying an electrical voltage to one set of metal pads 136 and grounding the other set of metal pads 138. The flow of current through the silicon beams 134 causes the temperature of the silicon beams to rise. An increase in temperature causes the silicon beams 134 to expand, a decrease will cause the beams to contract. The expansion of the silicon beams 134 results in a force in a linear direction that moves the silicon plate 132 (functioning as a fixed-pattern optic) in a linear direction.

FIG. 8A is a colorized sectional of the black and white sectional in FIG. 8B. The spatial shift of the pattern is preferably achieved by means of a further unique rotating pattern shifting device 300 (detailed in FIGS. 9, 10). One might note certain similarities in components between apparatus 200 and apparatus 100.

FIG. 9 is a side plan view of the rotating pattern shifting device 300. The unique design enables the projection of a pattern with an intensity that varies spatially in a linear manner. Rotation of the pattern optical wheel 310 (detailed in FIG. 10) causes the projected pattern to shift in a linear fashion. Changing the rate of rotation of wheel 310 changes the rate at which the pattern shifts in a linear direction.

FIGS. 11-13 diagrammatically represented (at 400, FIG. 13) is the triangulation method employed for measuring locations of points to obtain the 3-D shape of an object/subject-under-test 490', 490" in a Cartesian coordinate system. This basic approach for employing triangulation in traditional SLI 3-D image acquisition is well known: FIG. 11 illustrates a traditional camera-projector set up as can be used in SLI; 'point sources' of light and locations identified in FIG. 11 are mapped in diagram 400 (FIG. 13). By way of example in FIG. 12, SLI pattern 410' is shown projected on an example (angel statue) object-under-test 490' (mapped as 490").

FIG. 15 illustrates certain fundamental, known mathematical equations 500 that model the known concept of triangulation as understood in connection with 3-D image acquisition and surface recognition using structured light illumination (SLI) techniques. The expressions 500 shown are detailed and referenced elsewhere, including Section A., hereof, incorporated herein by reference.

FIGS. 16A, 16B, and 16C each depict digital reproductions of point cloud images 600, often simply called 'point clouds': FIGS. 16A, 16B each depict point clouds, respectively 610, 620, taken from single-shot measurements; and FIG. 16C is a composite point cloud made from two single-shot measurements 610, 620 that have been combined—or stitched—together to form the single, integrated/interlaced point cloud 630.

FIGS. 17, 18 include graphical representations and mathematical expressions: FIG. 17 at 700 represents a mathematical modeling and graphic illustrations representing an arbitrary rotation about three orthogonal axes; and FIG. 18 at 800 represents mathematical modeling of an arbitrary translation along three orthogonal axes.

FIG. 20 A high level flow diagram (labeled PRIOR ART) depicting the unique technique 2100—disclosed in Prov App '626 and Util App '607—leveraged by the measurement module/apparatus and technique of the invention.

DESCRIPTION DETAILING FEATURES OF THE INVENTION

Figure 1B:
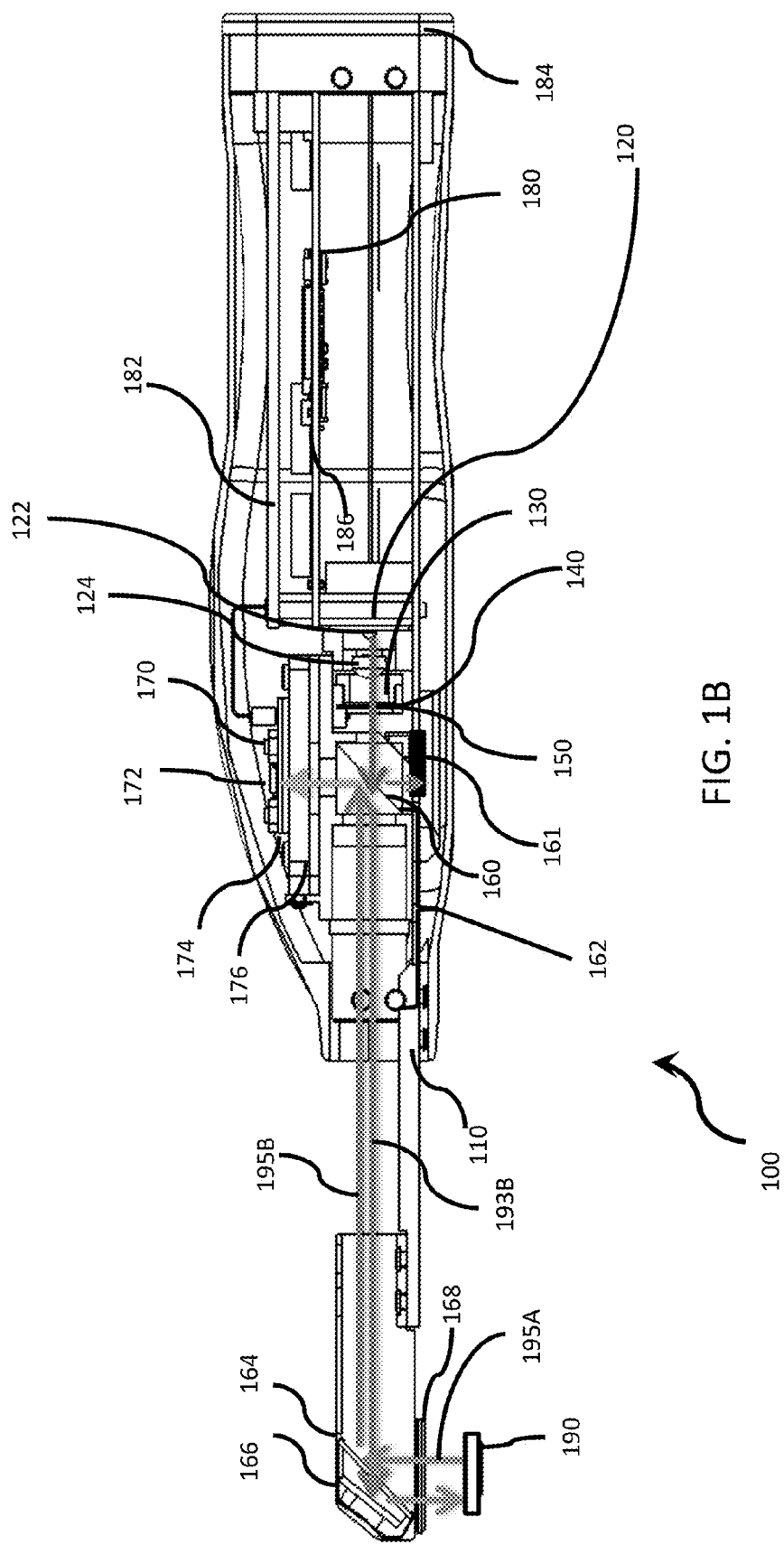
Figure 2A:
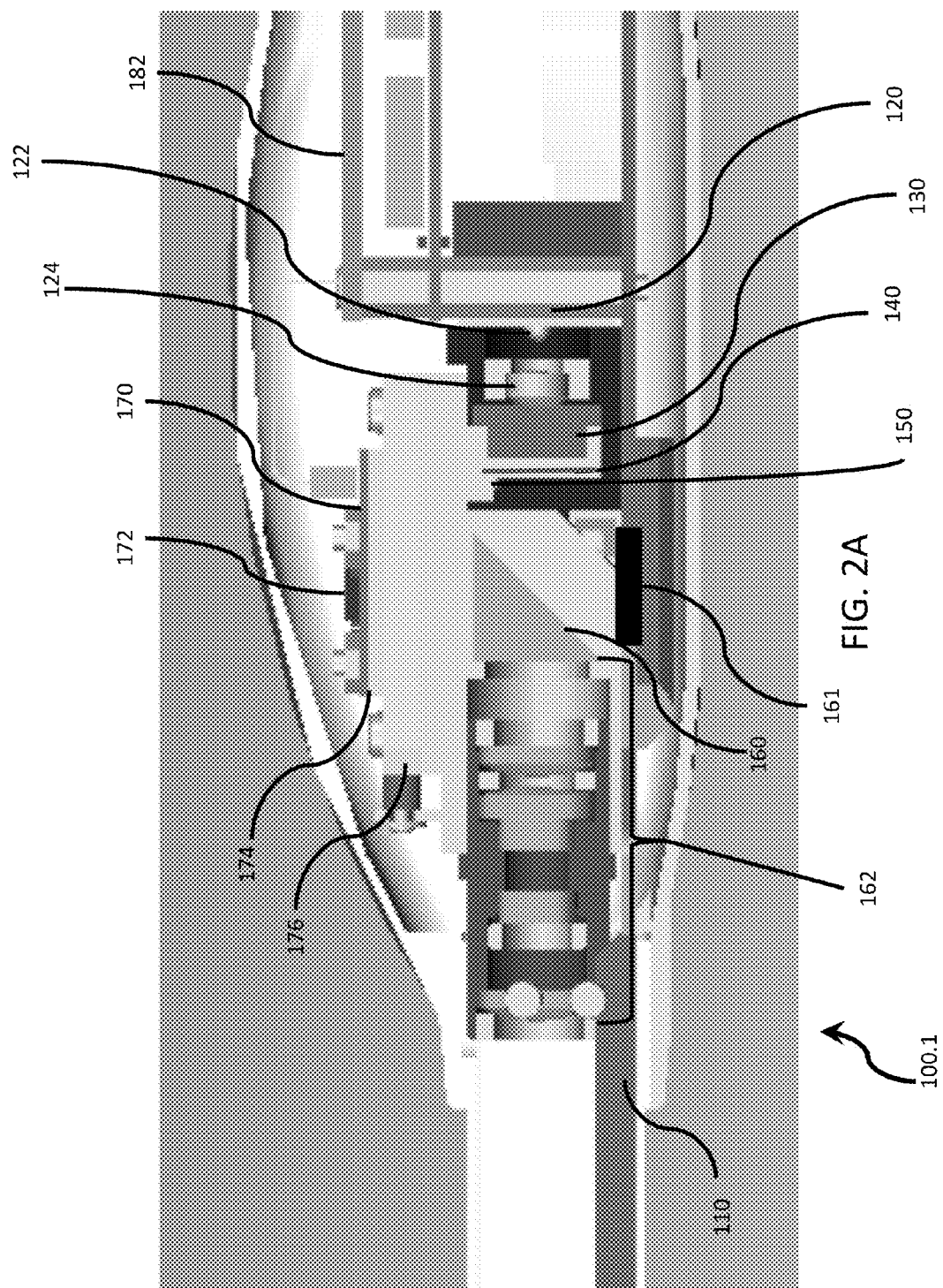
Figure 4A:
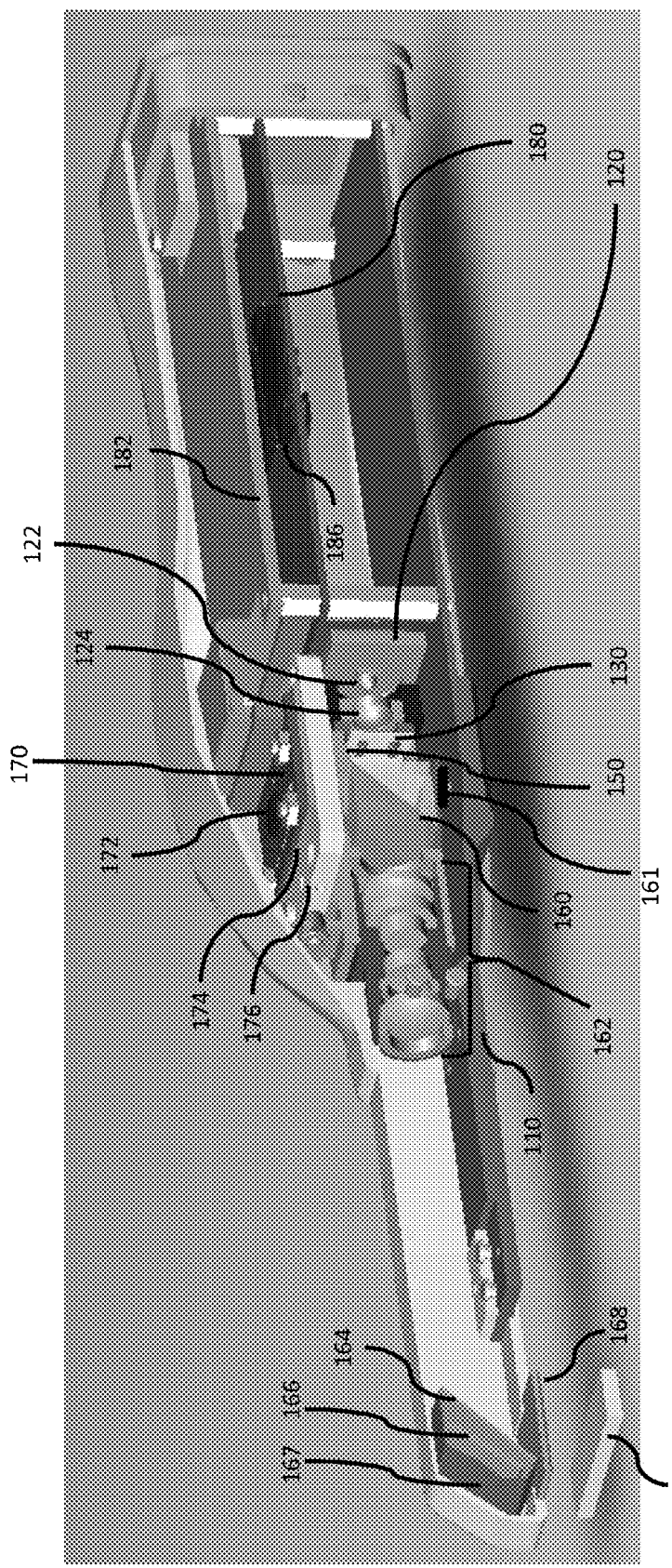
FIGS. 4A, 4B each include isometric views 100.3 of a preferred portable measurement module 100 implemented according to the invention using structured light similar to FIG. 1A.
Figure 4B:
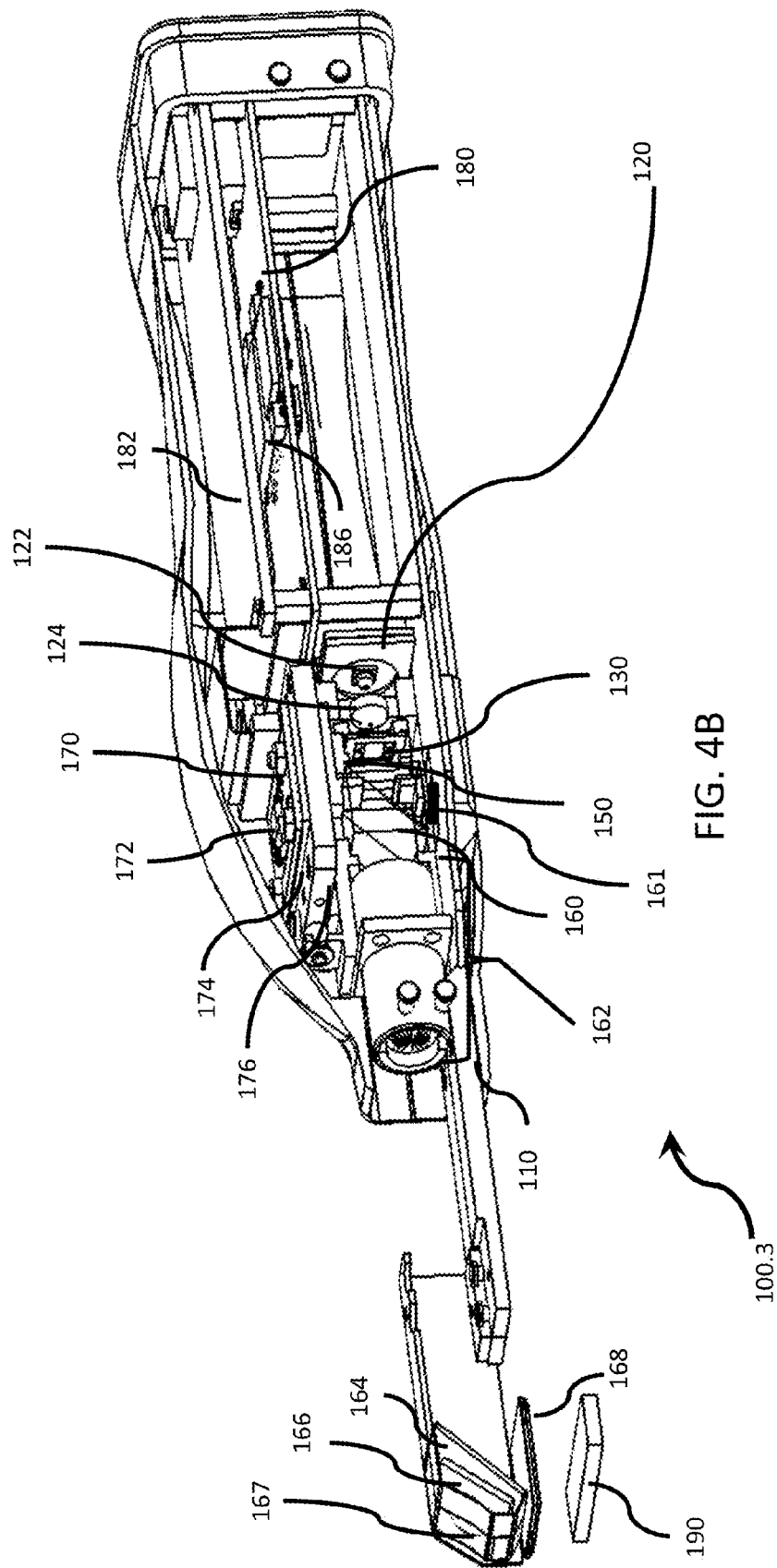
Figure 5B:
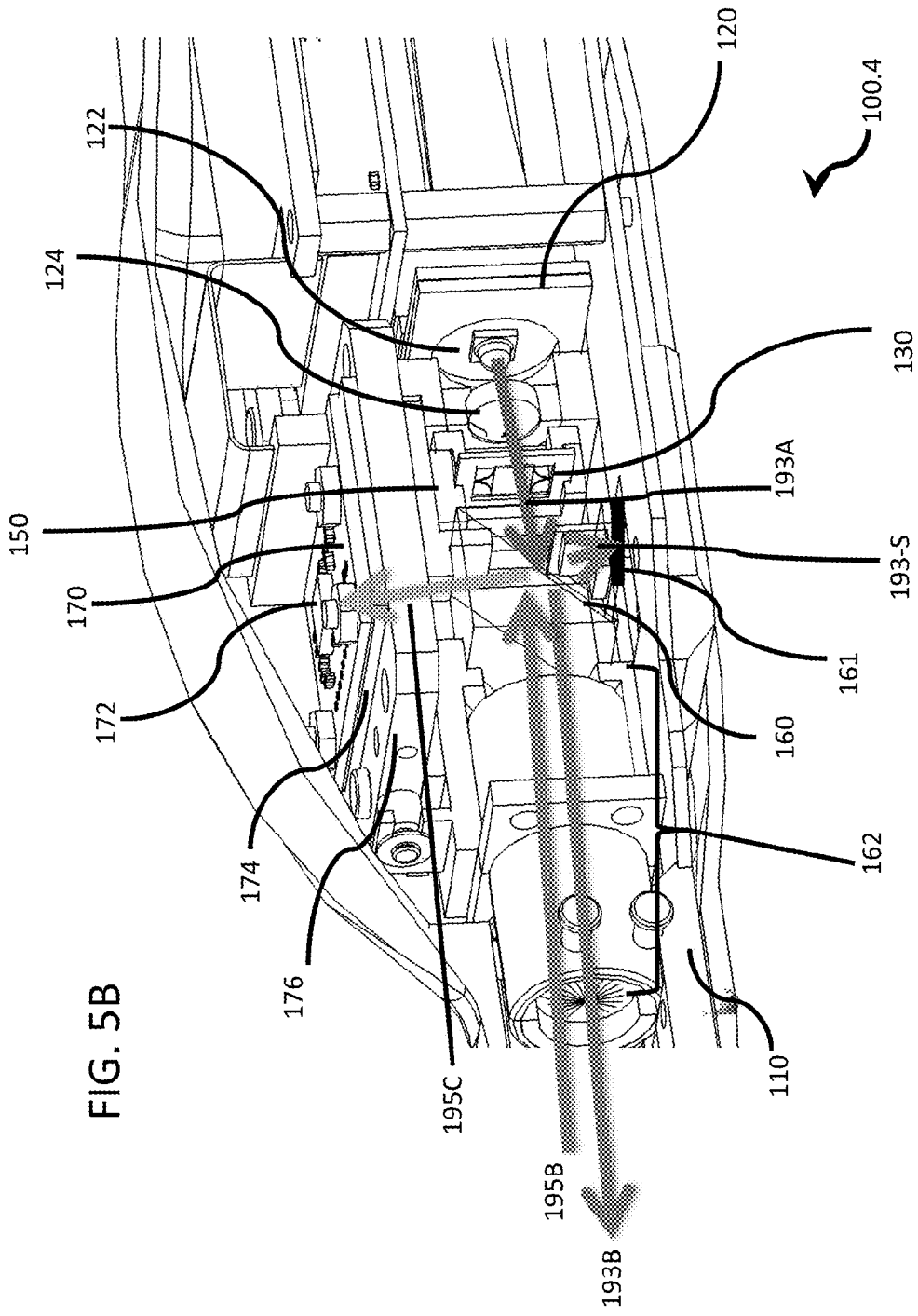
Figure 6A:
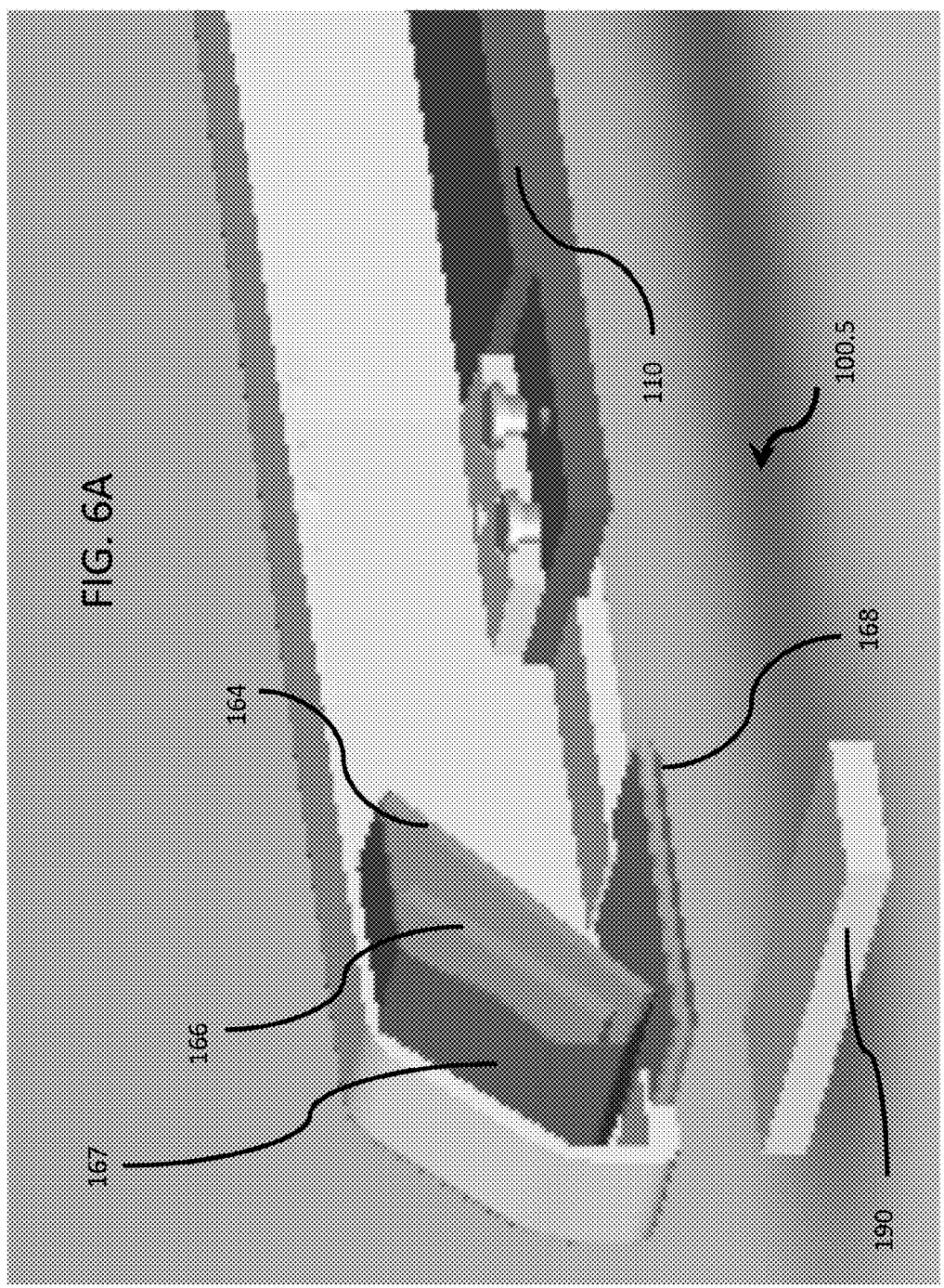

By viewing the figures, the technical reference materials incorporated by reference herein, one can further appreciate the unique nature of core as well as additional and alternative features of the new apparatus/module and associated system disclosed herein. Back-and-forth reference and association has been made to various features and components represented by, or identified in, the figures. While "FIG. 1." may be interchangeably referred to as "FIG. 1", as used throughout, either is intended to reference the same figure, i.e., the figure labeled FIG. 1 in the set of figures. Structural and functional details have been incorporated herein—by way of example only—to showcase the use of a compact measurement apparatus 100 (and 200) of the invention employing a projection system light source 122, 222, a lens element(s) incorporated within a novel linear pattern shifting device 130 (detailed in FIG. 7 having a unique fixed-pattern optic 132) from which a superimposed/overlaid SLI pattern (for example, SLI pattern 410, FIG. 14A) composed of a plurality of SLI patterns (graphically represented in FIG. 19, 910) is output to pass through a beam splitter 160 and projection-camera-lens assembly 162, and then through a second beam splitter 164 and against a mirror 166 to illuminate a surface of a 3-D object/subject-under-test (or 3-D area-under-inspection) 190, as the case may be.

The novel features of apparatus/module 100 are further detailed, as explained herethroughout, in FIGS. 1A-B, 2A-B, 3A-B, 4A-B, 5A-B, 6A-B, 7, 11, 12, 13, 14A-C, 15, 16A-C, 17A-D, and FIG. 18. To highlight the genius behind mechanical design of the apparatus of the invention, a second preferred measurement apparatus 200 is showcased, employing a high brightness light source 222 and a rotating pattern shifting device 300 having a pattern optical wheel 310 etched to comprise dual frequency pattern with a variety of selections of phase shifts, as labeled:

320 represents functionality for dual frequency pattern with 0 degrees phase shift

322 represents functionality for dual frequency pattern with 45 degrees phase shift

324 represents functionality for dual frequency pattern with 90 degrees phase shift

326 represents functionality for dual frequency pattern with 130 degrees phase shift

330 represents functionality for dual frequency pattern with 180 degrees phase shift

332 represents functionality for dual frequency pattern with 225 degrees phase shift

334 represents functionality for dual frequency pattern with 270 degrees phase shift

336 represents functionality for dual frequency pattern with 315 degrees phase shift After passing through rotating pattern shifting device 300 (see FIGS. 9-10 for further details), the SLI pattern composed of a plurality of SLI patterns is output to pass through a beam splitter 260 and projection-camera lens assembly 262, and then through a second beam splitter 264 and against a mirror 266 to, finally, illuminate a surface of a 3-D object/area/subject-under-test-or-inspection 290. Novel features of apparatus 200 are further detailed, as explained herethroughout, in FIGS. 8A-B, 9, 10, 11, 12, 13, 15, 16A-C, 17A-D, and FIG. 18.

The apparatus and technique of the invention establishes an optical and mechanical implementation leveraging real-time signal processing. Below is a list of components/features/assemblies shown and labeled throughout FIGS. 1-18 matching reference numeral with terms selected for components/features/assemblies depicted:

| Reference numeral | component/feature description |
| --- | --- |
| 100 | portable measurement module implemented according to the invention using structured light passing through a linear pattern shifting device 130 |
| 100.1 | enlarged view of portable measurement module 100, focusing on module center |
| 100.2 | enlarged view of portable measurement module 100, focusing on module tip |
| 100.3 | measurement module 100 of FIGS. 1A, 1B shown in an isometric view |
| 100.4 | enlarged view of measurement module 100.3, focusing on module center |
| 100.5 | enlarged view of measurement module 100.3, focusing on module tip |
| 110 | mechanical frame |
| 120 | heat sink for light source |
| 122 | projection system light source |
| 124 | light homogenization optic |
| 130 | linear pattern shifting device (fabricated utilizing MEMS techniques) |
| 132 | fixed-pattern optic (e.g., silicon or metal etched plate) |
| 134 | linear shifting element (by way of example only, a beam that is "H" shaped) |
| 136 | input voltage for linear shifting element |
| 138 | ground pads for linear shifting element |
| 140 | blur filter with fixed line |
| 150 | mechanical mount for the linear pattern shifting device |
| 160 | first beam splitter |
| 161 | beam dump/capture device |
| 162 | projection/camera lens assembly having at least one lens element |
| 164 | second beam splitter |
| 166 | reflector, such as a mirror or other reflective surface |
| 167 | clip/support for the reflector 166 |
| 168 | optical rotator |
| 169 | triangulation angle |
| 170 | image sensor board |
| 172 | image sensor |
| 174 | mount for image sensor |
| 176 | heat sink for image sensor |
| 180 | image sensor control circuitry |
| 182 | control circuitry for the linear pattern shifting device |
| 184 | input and output connector for power, data and control signals |
| 186 | system controller |
| 190 | Object/subject-under-test or inspection |
| 200 | portable measurement module implemented according to the invention using structured light passing through a rotating pattern shifting device 300 |
| 210 | mechanical frame |
| 220 | high brightness light source heat sink |
| 222 | high brightness light source |
| 224 | high brightness light source homogenization optic |
| 240 | blur filter with fixed line |
| 250 | mechanical mount for the rotating pattern shifting device 300 |
| 260 | first beam splitter |
| 262 | projection and camera lens assembly |
| 264 | second beam splitter |
| 266 | mirror |
| 267 | mirror clip |
| 268 | optical rotator |
| 270 | image sensor board |
| 272 | image sensor |
| 274 | mount for image sensor |
| 276 | heat sink for image sensor |
| 280 | image sensor control circuitry |
| 282 | control circuitry for the rotating pattern shifting device 300 |
| 284 | input and output connector for power, data, and control signals |
| 286 | system controller |
| 290 | Object/subject-under-test or inspection |
| 300 | rotating pattern shifting device |
| 310 | pattern optical wheel |
| 320 | represents functionality for dual freq. pattern with 0 degrees phase shift |
| 322 | represents functionality for dual freq. pattern with 45 degrees phase shift |
| 324 | represents functionality for dual freq. pattern with 90 degrees phase shift |
| 326 | represents functionality for dual freq. pattern with 130 degrees phase shift |
| 330 | represents functionality for dual freq. pattern with 180 degrees phase shift |
| 332 | represents functionality for dual freq. pattern with 225 degrees phase shift |
| 334 | represents functionality for dual freq. pattern with 270 degrees phase shift |
| 336 | represents functionality for dual freq. pattern with 315 degrees phase shift |
| 340 | holes/apertures for synchronization with camera (operational as optic switches) |
| 350 | hole/aperture for identifying zero phase shift location of low freq. pattern |
| 360 | center hole/aperture for mounting motor |
| 370 | mount for attaching pattern optical wheel to the motor/rotating means |

-continued

| Reference numeral | component/feature description |
| --- | --- |
| 380 | motor/rotator/rotating means |
| 400 | diagrammatically illustrates (FIG. 13) the triangulation method employed for measuring locations of points to obtain the 3-D shape of an object under test in a Cartesian coordinate system: points identified in diagram 400 are related to a traditional projector camera assembly (FIG. 11) to produce a structured light pattern such as that labeled 410' onto an object/subject/surface-under-test 490' (FIG. 12). The object/subject/surface-under-test is represented at 490" in diagram 400 (FIG. 13). |
| 410 | preferred embodiment of the light pattern that is projected onto the object/subject-under-test. SLI light pattern 410 is preferably projected in apparatus 100 (i.e., projected from linear pattern shifting device 130). The pattern is comprised of the sum of two sinusoidally varying intensity patterns that vary along a single, parallel axis. |
| 410.1, 410.2 | each of 410.1 and 410.2 are further magnified, plan views of SLI light pattern 410 (shown in FIG. 14A), as implemented by the linear pattern shifting device. |
| 420 | conventional projection system |
| 430 | conventional camera system |
| 440 | distance between camera system and projection system |
| 450 | intersection between projected row and camera column |
| 490', 490" | representative of an example object/subject/surface-under-test |
| 500 | mathematical formulations comprising several known expressions that model conventional/standard technique of triangulation, see also Section A. hereof. |
| 510 | equation for projected pattern for structured light triangulation technique |
| 520 | equation for image captured by camera for structured light triangulation technique |
| 530 | method of phase calculation for structured light triangulation technique |
| 540 | relationship between camera pixel coordinates and projected pattern row for structured light triangulation technique |
| 550 | XYZ position calculation for structured light triangulation technique |
| 600 | measurement output, collectively representing concept of point clouds. |
| 610 | first measured point cloud |
| 620 | second measured point cloud |
| 630 | interlaced point cloud comprised of first 610 and second 620 point clouds |
| 700 | mathematical modeling/graphic illustration of an arbitrary rotation about three orthogonal axes |
| 800 | mathematical modeling of an arbitrary translation along three orthogonal axes. |
| 900 | patterned optic implementation as contemplated according to Section A., hereof (also published as 1 Mar. 2010/Vol. 18, No. 5/Optics Express 5233) |
| 910 | graphic representation of a pixel profile intensity pattern using expression 950 which is explained in greater detail in Section A., hereof (also published as 1 Mar. 2010/Vol. 18, No. 5/Optics Express 5233) where it is labeled Eqn. (8). A pattern projected according to 950 (whether physically etched or deposited onto a substrate as contemplated herein) may preferably be comprised of, for example, a high frequency sine wave pattern and a low frequency sine wave pattern as represented at 905, FIG. 19. |
| 950 | expression defining a profile pattern of pixel intensity depicted graphically at 910 for use with a fixed-pattern optic such as 132 (FIG. 7) or 310 (FIG. 10) according to the invention; this expression is explained in greater detail in Section A., hereof (also published as 1 Mar. 2010/Vol. 18, No. 5/Optics Express 5233) where it is labeled Eqn. (8). |
| 905 | graphic representing the periodic interrelationship of superimposed sign waves - a high frequency sine wave pattern and a low frequency sine wave pattern - as contemplated under expression 950, i.e., "Eqn. (8)" in Section A., hereof. |

FIGS. 11-13, graphically depict the SLI mathematical technique known as triangulation currently employed to determine location of a point on a 3-D surface of an object/subject-of-interest 490', 490". A projector (420) is used to project SLI patterns onto an object under test. The camera (430) observes the object-under-test. A triangle is formed between the projector, a point on the object-under-test, and the camera. Through calibration, the relationship between the camera and the projector is established. Based on this relationship, the distance between the measurement system and points on the object under test can be determined.

In traditional structured light, the distance to the object under test and the triangulation angle, the angle between the optic axis of the camera and the optic axis of the projector, determine the overall size of the measurement system. Triangulation angles of fifteen degrees or more are generally necessary for making accurate measurements; therefore, conventional SLI systems all require a relatively large footprint (physical size) in order to measure the surface of objects, small or large. In order to maintain the same triangulation angle, if the distance from the object under test is increased, the baseline, the distance between the camera and the projector, must also be increased.

Traditional SLI systems frequently use digital projectors to project the SLI patterns. The use of digital projectors enables these measurement systems to project a variety of patterns by way of sophisticated programming of the projector's processing unit. However, use of expensive digital projectors increase the size, cost and complexity of these measurement systems and can severely limit 3-D surface measurement speed.

Turning, again, to FIGS. 11-13, diagrammatically represented at 400, FIG. 13 is a triangulation technique employed for measuring locations of points to obtain the 3-D shape of an object/subject-under-test 490', 490" in a Cartesian coordinate system. This basic approach for employing triangulation in traditional SLI 3-D image acquisition is well known: FIG. 11 illustrates a traditional camera-projector set up as can be used in SLI. 'Point sources' of light and locations identified in FIG. 11 are mapped in FIG. 13 at 400. By way of example in FIG. 12, SLI pattern 410' is shown projected on an example (angel statue) object/subject-under-test 490' (mapped as 490"). In operation, projection system 420 projects a pattern through an aperture (not labeled for simplicity) in the projector that is focused onto an object-under-test 490', 490" (FIGS. 12 and 13). The pattern 410' is distorted by the shape of the object 490' according to the object's 3-D surface characteristics. Provided the distorted pattern is within the field of view of camera 430 the distortions are recorded by the camera which observes the object-under-test through the camera's aperture (not labeled, for simplicity). Only portions of the object-under-test both within the SLI pattern illumination area 410' and within the camera's field of view can be measured.

The very novel approach disclosed herein incorporates polarization optics to create a portable module in which the camera and projector optics are located along nearly the same axis. The triangulation angle is set using a further unique combination of a mirror and a polarizing beam splitter. Thus, sufficiently large effective triangulation angles are achieved without the need for a large physical separation between the camera and the projector. Furthermore, two alternative novel approaches have been developed for generating and projecting SLI patterns in the instant invention: (1) projecting patterns by shifting a fixed pattern in a linear direction; and (2) projecting patterns by rotating a fixed pattern.

Complex patterns can be employed; in one preferred embodiment, the pattern incorporates and implements the dual-frequency structured light technique disclosed in U.S. Provisional Patent Application 61/371,626, Liu et al. ("Prov App '626"). The unique SLI patterning technique disclosed in Provisional App '626 comprises: (1) a unique pattern strategy component (examples of which are included, herein, as detailed in technical discussions found in the instant application and labeled Section A. "Dual-frequency pattern scheme for high-speed 3-D shape measurement" and Section B. "Period Coded Phase Measuring Strategy for 3-D Realtime Acquisition and Data Processing"); and (2) a unique de-codification image processing component (an example of which is included, herein, as detailed in the technical discussion of the instant application and labeled Section C. "LUT-based processing for structured light illumination real-time phase and 3-D surface reconstruction").

Figure 14A:
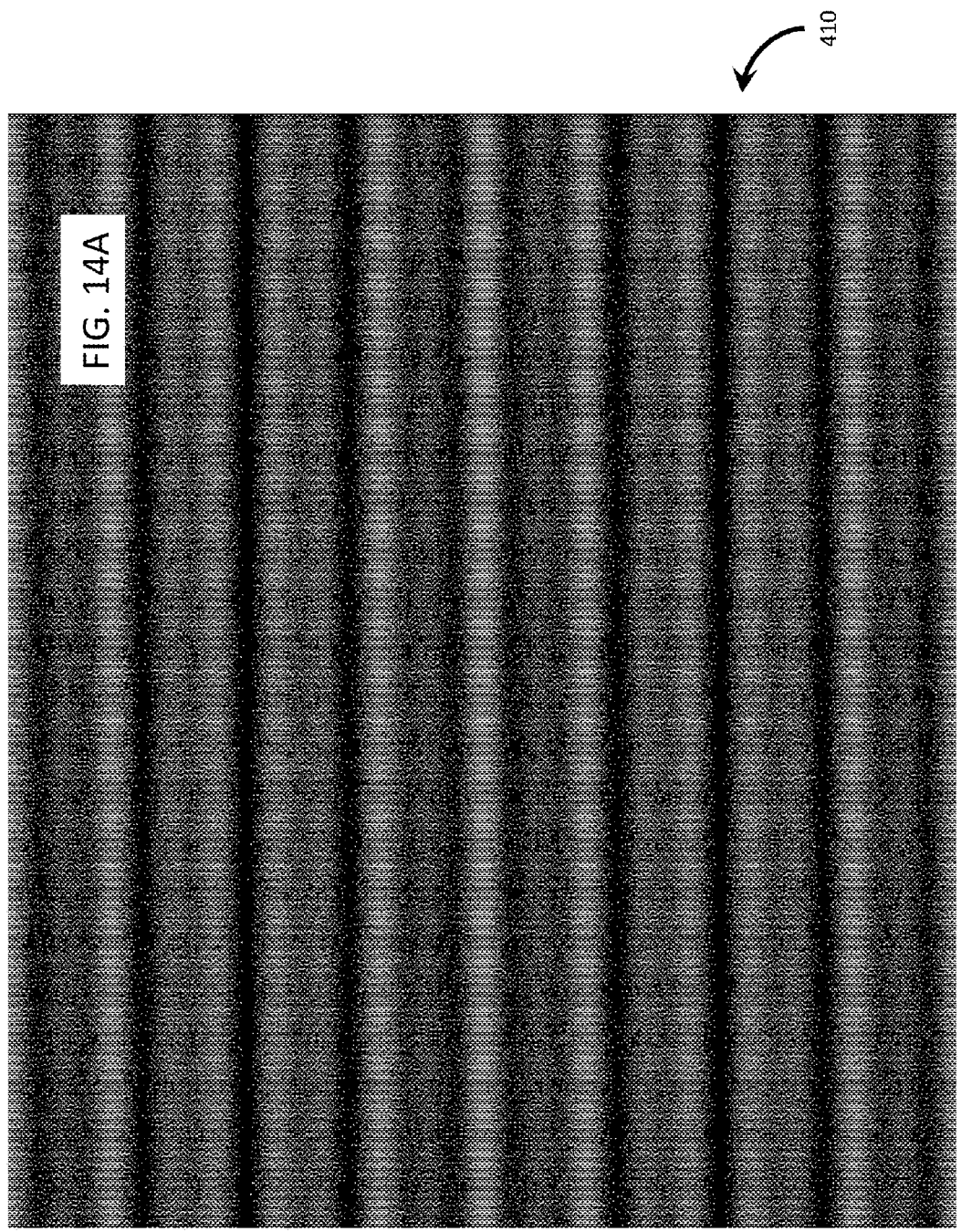
FIG. 14A is a plan view of a preferred embodiment of the light pattern 410 that is projected onto the object/subject-under-test. SLI light pattern 410 is preferably projected in apparatus 100 (i.e., projected from linear pattern shifting device 130). The pattern is comprised of the sum of two sinusoidally varying intensity patterns that vary along a single, parallel axis.

In the implementation of apparatus/module 100, FIG. 1A, which incorporates a linear shifting pattern device 130, having fixed-pattern optic 132 from which SLI pattern 410 is projected, FIG. 14A, can be etched into a silicon substrate and or etched, into a metal substrate. In either case, using well known techniques and chemical etchants selected depending upon the substrate chosen, the etchant is applied to fabricate the fixed pattern. Using conventional, well understood processes: preferably exposed portions of the silicon or metal substrate are etched away by removing the etchant; alternatively, an opaque material can be deposited atop a transparent substrate/lens member. Conventional etching processes leave the substrate comprised of areas which completely block the incident light and areas which completely transmit the incident light. Depositing an opaque material atop a transparent substrate/lens likewise creates areas where light is blocked and light is transmitted therethrough. In this sense, conventional etching processes and substrate depositing processes can be considered to display light in a 'binary' manner (i.e., opaque areas where material is left intact produce dark areas and transparent areas of the etched substrate support where material has been etched-away produce light regions).

Since grayscale values are required for accurate 3-D measurements using structured light, applicants designed and implemented their very unique approach to etching away, depositing upon, or otherwise fixing into a substrate support a preselected fixed SLI pattern. Applicants uniquely adapted a traditionally 'binary' process of etching/material depositing to produce projected patterns with varying grayscale values: To achieve intermediate (gradient) light levels to replicate the gradients found in a sinusoidally varying intensity pattern, a process similar to half-toning was used. The pattern 410 (see FIGS. 14A-14C, enlargements depicted at 410.1, 410.2) is preferably etched, deposited, or otherwise fixed in the form of a binary variation of the projected superimposed/overlaid SLI pattern (composed of a plurality of SLI patterns) that eventually travels within module 100, 300 to illuminate a surface of a 3-D object/subject-under-test. Combinations of holes (where material has been removed, e.g., etched), and opaque areas (where material remains intact) are used to create preselected gradient (intermediate light) values, in operation during projection of the pattern 410. To achieve—and project 193A,B through apparatus 100—a continuous tone gray scale image of the binary fixed-pattern 410, the Modulation Transfer Function (MTF) of the lens is employed to blur the binary fixed-pattern. This is, in effect, a 'spatial blurring' within device 130, by way of spatially shifting pattern 132 (by shifting the pattern in a linear fashion by applying an electrical voltage to one set of metal pads 136 and grounding the other set of metal pads 138).

By way of background, only: The sharpness of a photographic imaging system, or of each component of the system (lens, image sensor, scanner, etc.) is characterized by an MTF, a set of points that represent measurement of the contrast at a given spatial frequency, f, relative to the contrast at low frequencies. MTF is a frequency response that involves spatial frequency (hence, the term 'spatial frequency response'): It is reported and graphically represented in cycles (line pairs) per distance (millimeters or inches); or in the context of digital cameras, cycles/pixel (c/p) or line widths per picture height (LW/PH). High spatial frequencies correspond to fine image detail. The more extended the response, the finer the detail and the sharper the image.

Alternatively, to achieve a continuous tone gray scale image of the binary fixed-pattern 410, the intensity of projected light can be averaged over a local area to achieve a preselected intermediate value (i.e., performing a blurring of the digital image in the processing unit—in effect, making the image sensor out-of-focus, rather than employing MTF to the projector lens).

In the case of unit 200, patterned wheel 310 (FIG. 10) of device 300 (FIG. 9) is set in motion, as explained in detail elsewhere, by spinning at a preselected rate to 'spatially blur' the wheel binary pattern, to achieve a continuous tone gray scale image of the binary fixed-pattern of wheel 310 that gets projected 193A,B through apparatus 200 (FIG. 8).

The pattern shifting device (130 in module 100, 300 in module 200) employs a fixed pattern optic (for example, 132 in the case of device 130, or patterned wheel 310 in the case of device 300) from which a superimposed/overlaid SLI pattern (composed of a plurality of SLI patterns) is output to travel within module 100, 300 to illuminate a surface of a 3-D object/subject-under-test (e.g., 190, 290). Spatial shifting of the pattern 132 is achieved by shifting the pattern in a linear fashion by applying an electrical voltage to one set of metal pads 136 and grounding the other set of metal pads 138. The flow of current through the silicon beams 134 causes the temperature of the silicon beams to rise. An increase in temperature causes the silicon beams 134 to expand, a decrease will cause the beams to contract. The expansion of the silicon beams 134 results in a force in a linear direction that moves the silicon plate 132 (functioning as a fixed-pattern optic) in a linear direction.

One can appreciate the great flexibility of apparatus design: Object/subject-under-test 190, 290 might be any area of interest/inspection, say, an area of concern—decay, cracks, or other abnormality—within an oral cavity of a mammal (e.g., a child's tooth, an infected gum), a defect in a product undergoing manufacture, an area of suspected fracture or weakness within pipe/tubing, an area of concern within a cavity of a hydraulic system, and so on. Sophisticated SLI phase unwrapping algorithms performed with high-end processing units are traditionally required to enable positioning of precise measurements within a larger field-of-view (FOV), provided the FOV is accompanied by a distance that extends further than the unambiguous range of the structured light pattern. Not so for the instant invention. While 3-D measurements are preferably taken of a surface-of-interest using measurement apparatus 100 or 200 employing the dual frequency approach without phase unwrapping (see Section A. "Dual-frequency pattern scheme for high-speed 3-D shape measurement"), one might choose to perform phase unwrapping under suitable conditions.

Figure 10:
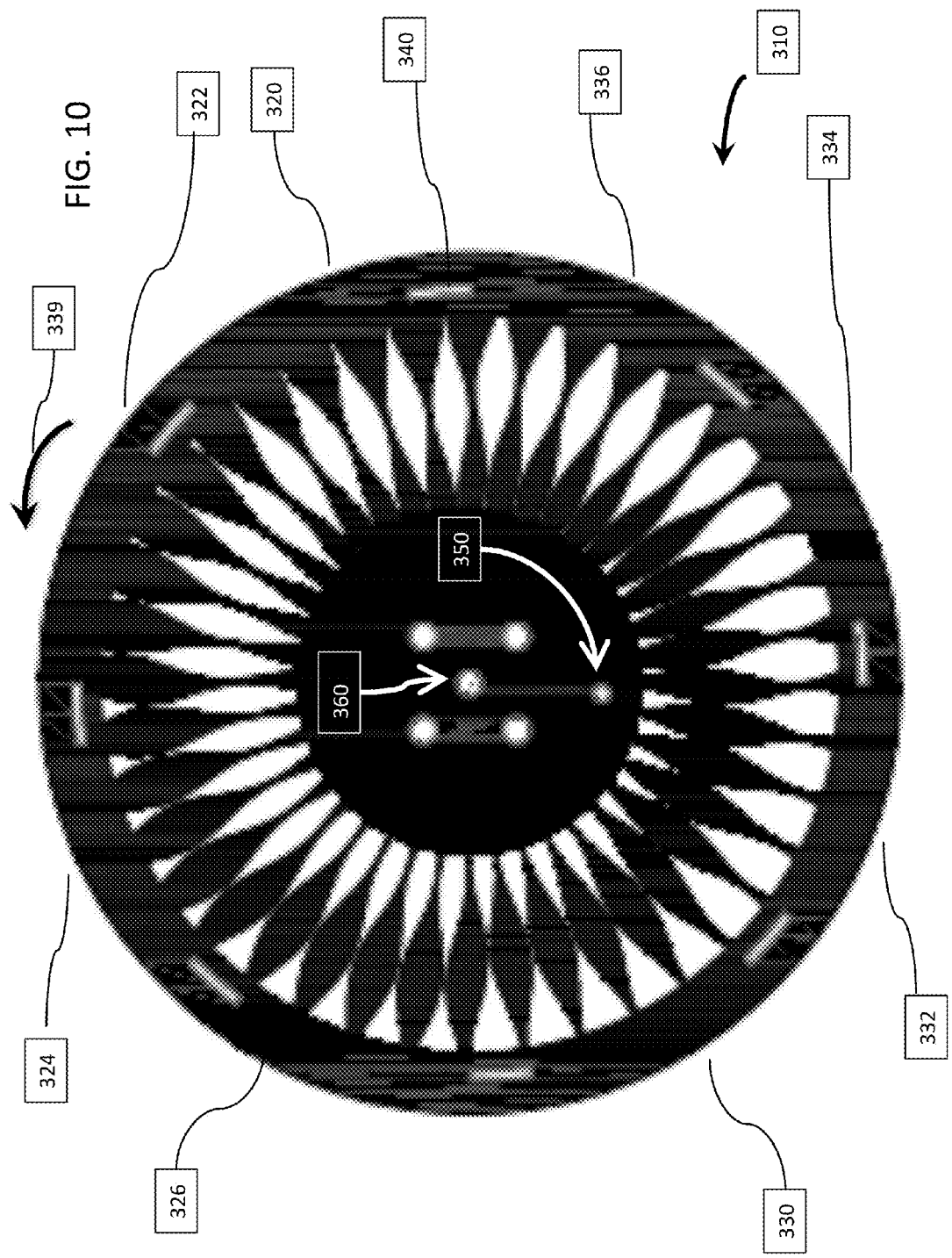
FIG. 10 is a front plan view of the pattern (dark represents material, light represents an opening through which light can pass) etched into pattern optical wheel 310. In a preferred embodiment, passing light from front to back through the etched pattern in wheel 310 results in the projection of light that, across a field of view, varies linearly in intensity along one direction and is constant along the other direction. Thus, rotating optical wheel 310 causes the pattern to shift spatially. The spatial shift occurs on the direction in which the intensity of the light varies. In addition to the pattern, a set of synchronization holes, or apertures, labeled 340, 350 are etched into the optical wheel. One set 340 provides timing marks that behave as optical switches to open and close the shutter in the camera. Hole/aperture 350 provides a single timing mark for recording (and tracking) the rate of rotation of the optical wheel.

In the case of either fixed-pattern optic 132 of device 130 or fixed-pattern wheel 310 of device 300, the fixed pattern as preferably implemented has a plurality of sine wave patterns overlaid into a resultant SLI pattern such as is described in Section A and Section B, herein. Expression 950, FIG. 19, mathematically models a profile pattern of pixel intensity (910) for use with the fixed-patterned optic 132, 310 (FIGS. 7 and 10, respectively). Pixel intensity profile pattern 910 is 'fixed' into a transparent lens member, by way of etching into, depositing onto, or otherwise 'fixing' into a lens member (such as 132, 310), causing light entering the patterned optic from a source (such as 122, FIG. 1A et al, 222, FIG. 8A, et al.,) to exit as a patterned light output having the pixel intensity profile pattern governed by expression 950. Expression 950 is discussed in greater detail in Section A, where it is labeled as Eqn. (8). As a result, the projected pattern (physically etched or deposited onto a lens member) is comprised of, for example, a high frequency sine wave pattern and a low frequency sinewave pattern (this combination of sine waves is graphically represented at 905, FIG. 19). The high frequency pattern enables precise measurement of the 3-D shape of objects-under-test by more-precisely locating points (fine measurement). The lower frequency pattern enables rough (course) measurement estimates of the distance between points on the 3-D surface/object-under-test and the measurement system. As mentioned elsewhere, this eliminates the conventional employment of additional, sophisticated computer processing required when applying phase unwrapping algorithms necessary for digital SLI pattern projection.

EXAMPLES

Illustrating Features and Alternative Useful Structures of Embodiments

The technique and system of the invention are useful in operation to make real-time calculations of 3-D data measured with a camera subsystem from a surface of an object/subject-under-test 190, 290 such as an area or surface of inspection/interest, say, an area of concern—decay, cracks, or other abnormality—within an oral cavity of a mammal (e.g., a child's tooth, an infected gum), a defect in a product undergoing manufacture, an area of suspected fracture or weakness within pipe/tubing, an area of concern within a cavity of a hydraulic system, and so on.

Unlike conventional structured light measurement systems, the compact 3D measurement module, 100, 200, has a lens system that serves as both the projection lens for the pattern projection subsystem and the camera lens for the image acquisition subsystem. Discrimination between the projected information and the image information is accomplished by means of polarizing beam splitters and a quarter-wave plate. FIGS. 1B, 2B, 3B, 5B, 6B, and 8B each have directional arrows representing the general direction of the light path through the apparatus/module 100, 200 from light source 122; 272 to illumination of the object/subject-under-test or inspection 190, 290 along pathways labeled 193A, 193B, 193C, and back through apparatus/module 100, 200 along pathways 195A, 195B, 195C and into image sensor 172—as further detailed below and elsewhere, herein.

Using a condenser lens system, light from a non-polarized light source (e.g., a light emitting diode or LED) 122, 222 is collected and focused onto a patterned-optic (132, 310) to form the projected light pattern. The light (pathway 193A) then passes through a polarizing beam splitter (160, 260). The output light is polarized into a single polarization state along a path (193B) toward the tip (100.2, 100.5, FIGS. 3A-B, 6A-B). This light proceeds through the projection/camera lens assembly (162, 262) on its way to illuminate the object/subject-under-test or inspection (190, 290). The projected light pattern passes through a second polarizing beam splitter (164, 264), whose axis is aligned with the polarization state of the light, reflects off of a mirror (166, 266), then along 193C passes through a quarter-wave plate (i.e., optical rotator 168, 268), and is incident on the object/subject-under-test or inspection (190, 290).

The quarter-wave plate (168, 268) rotates the polarization state of the incident light by 45 degrees. Light scattered by the object-under-test (190, 290) passes back through the quarter-wave plate (168, 268) and is rotated an additional 45 degrees. Relative to the polarization state of the projected light pattern, the net rotation is 90 degrees: the polarization state of the scattered light is, largely, orthogonal to the projected light pattern path through the body of the apparatus/module (100, 200) and, consequently, is reflected by the second polarizing beam splitter (164, 264) back towards through the projection/camera lens assembly (162, 262).

The scattered light enters the first polarizing beam splitter (160, 260) and, because the polarization state is orthogonal to the projected light pattern path through the body of module 100, 200, the returning scattered light reflected off the object-under-test 190, 290 does not proceed to the light source. More particularly, the polarization state of the desired signal is orthogonal to the projected patter; however the return signal is reflected to the camera module because of the design of the first polarizing beam splitter. The first polarizing beam splitter is designed to transmit s-polarized light and reflect p-polarized light. The projected pattern, which is initially unpolarized, becomes p-polarized after passing through the first polarizing beam splitter. The return light is s-polarized: this polarization state is set by the second polarizing beam splitter. Instead, the scattered light is reflected to the camera module (as shown, consists of image sensor board 170, image sensor 172, mount for image sensor 174 heat sink for image sensor 176, image sensor control circuitry 180) and detected and measured by the image sensor 172. The camera module captures the image which is then further processed to produce a 3D point cloud, an example of stitching point cloud images is shown in FIGS. 16A-16C.

MEMS Technology.

Using known semiconductor wafer processing techniques, the desired pattern is physically etched into a silicon plate. The silicon plate is suspended inside a silicon frame by a series of beams. The frame was fabricated through etching, also. The beams 134 are connected, via metal, to metal pads. When voltage is applied to the device through the metal pads 136, and current is allowed to flow through the series of beams 134, the current causes the temperature in the beams to rise. The change in temperature causes beams 134 to expand. The expansion of the beams forces the silicon plate to move linearly in one direction. By controlling the current flow through the beams, the displacement of the silicon plate is controlled. In this manner, the projected light pattern can be made to shift across the object-under-test. The resulting shifts can be controlled to achieve the shifts needed to calculate the 3D position of each measured point of the object-under-test.

In the second of two preferred embodiments, the SLI pattern is etched into a wheel 310 (FIG. 10) made of a suitably sturdy substrate, e.g., metal. Spatial shifting of the pattern is achieved by rotating the pattern. Rotating wheel 310 in a circular fashion (e.g., rotationally in the direction labeled 339) produces an intensity of the projected pattern that varies spatially in a linear fashion and shifted in a linear fashion. In addition, further unique features have been incorporated into the design of wheel 310 to ensure proper synchronization with camera subsystem (image sensor 272, image sensor control circuitry 280, and so on).

In addition to etching the projected light pattern into the wheel, two types of synchronization holes were also etched into the wheel. Pattern synchronization holes (slightly elongated apertures) 340 are etched to ensure that the opening and closing of the camera shutter was timed with the projected pattern. An electronic signal for achieving synchronization with the camera was achieved through the use of a photo-interrupter circuit. This circuit contains both an LED and a PIN diode light detector. During rotation of the wheel, when the LED light from the photo-interrupter circuit passes through a pattern synchronization hole, the LED light is detected by the PIN diode light detector. The PIN diode light detector outputs and electrical signal that is used by the camera to open a shutter. When the light is blocked by the metal portion of the wheel, the output of the PIN diode light detector drops and the camera shutter closes. In a similar manner, a synchronization hole for counting wheel revolutions was also implemented.

In order to make accurate measurements, the apparatus/module 100, 200 requires calibration. Calibration determines the relationship between projected pattern as it exits the fixed-patterned optic (132, 310) and the image sensor of the camera module. Verification is done to ensure that the system is within a desired accuracy. Verification is performed periodically; if the measurement system fails the verification test, calibration is performed to bring the measurement system back into compliance. Calibration can be achieved through the use of a flat, diffusely reflective target with black dots with a known and uniform spacing on the surface of the target. The calibration target is moved to several positions, typically five; at each position, data is captured using the camera. The distance between each position is precisely known. The accuracy of the calibration is a function of the accuracy of the placement of the dots and the accuracy to which the calibration target is moved. Verification is achieved by measuring objects of know dimension at various angles and distances.

The unique 3D measurement module 100, 200 uses a projection/camera lens assembly 162, 262 for pattern projection and image capture. As explained elsewhere, and detailed in side sectional views FIGS. 1A-B, 2A-B, 4A-B, 5A-B, and 8A-B, the projection/camera assembly 162, 262 is located along the same axis (i.e., 'on-axis'). As shown, the axis of the projection/camera assembly 162, 262 is generally parallel with both the pathway (labeled 193B) for SLI pattern projected from light coming from a source 122, 222 through linear pattern shifting device 130 or rotating pattern shifting device 300, and the pathway (labeled 195B) of light reflected off the object-under-test 190, 290 back through module 100, 200. Discrimination between the projected light and the captured light, the light observed by the camera module, is accomplished through polarization separation optics (as designed, 160, 260 and 164, 264).

The optics are held in a mechanical frame 110. A heat sink element 120, 220 is used to draw heat from the projection system's light source 122, 222 in an effort to prevent overheating of the area to aid in stable operation of the light source. The light output from 122 does not have a uniform spatial intensity. Better performance is achieved if the pattern optic 132 is illuminated with light of a uniform intensity. The output of 122 is homogenized, or made to be uniform, with the light homogenization optic 124. The output of 124 illuminates 132. The linear pattern shifting device 130 shifts 132 in a linear direction through the application of a voltage to the input voltage for linear shifting element (e.g., pads) 136. A preferred embodiment of device 130 is implemented with thermal actuation to create motion of fixed-pattern optic/plate 132. Hickey, in U.S. Pat. No. 7,043,910, describes a method of using thermal energy to create motion in a silicon-based micro-electro-mechanical system. Dhuler et al in U.S. Pat. No. 6,410,361, also describe a thermal method of enabling motion in a micro-electro-mechanical system. Thus, the general concept of applying a voltage to generate heat to move tiny MEMS elements is known.

The voltage applied to area/pads 136 causes current to flow through conductive regions of device 130. The current flows through the linear shifting element 134, preferably made of conductive traces—by way of example, only, shaped in the form of an "H"—causing the temperature of 134 to rise. The material of 134 is chosen such that an increase in temperature will result in a preselected expansion, or lateral change in length, δ, from an 'at rest' physical dimension of linear shifting element 134 at ambient temperature. In one preferred embodiment, silicon is used to fabricate 134. The expansion, δ, of the physical size of 134 results in the application of a force on 132. Consequently, fixed-patterned optic 132 moves laterally an amount generally proportionate to change in length, δ, and is related to the applied voltage. For example as shown, applying a voltage of 3V results in a motion of 200 micrometers. The linear pattern shifting device circuit is grounded through element 138. Precise control of the voltage applied and timing for each linear shift of 132 is controlled by control circuitry 182. The components and elements identified above result in the projection of an SLI pattern of light of an intensity that varies spatially as well as a function of time.

The projected light pattern is incident on the blur filter with fixed line 140; 140 slightly degrades the modulation transfer function of the system; this ensures that the projected grayscale values are uniform and do not change abruptly in a stair-step like fashion. The fixed line of 140 provides a phase reference for the phase unwrapping step in the calculation of the XYZ points of the object-under-test 190. Linear pattern shifting device 130 is supported by suitable mechanical mount 150 (best viewed in FIG. 4A). Suitable materials for mount 150 are those that can help prevent device failure due to differential coefficients of thermal expansion (CTE). Preferably, the CTE of the material selected for mount 150 is chosen to closely match the CTE value of the material of 130. For example, in the event silicon substrate is selected as base material for device 130, mount 150 can be fabricated out of alumina.

While discrimination between the projected light and the light captured by the camera may be accomplished by a variety of alternative means, in one preferred embodiment, as described herein, discrimination is based on the polarization of the light. For additional reference, see FIGS. 1B, 2B, 3B, 5B, 6B, and 8B. The projected light output from 140, 240 is unpolarized (pathway 193A); this light is incident on a first beam splitter 160, 260 which is designed to transmit p-polarized light and reflect s-polarized. Useful definitions of the polarization states can be found, for example, in: Born, Max and Wolf, Emil 1999, *Principles of Optics: Electromagnetic Theory of Propagation, Interference and Diffraction of Light*, The Press Syndicate of the University of Cambridge. The p-polarized light propagates through 160 (pathway 193B); and the s-polarized light is reflected (pathway 193-S) to a beam dump 161. Functionally, beam dump 161 absorbs the s-polarized light (pathway 193-S), preventing a majority of the light from scattering back into the optical system. The projected pattern then propagates (pathway labeled 193B) through the combination projection/camera lens assembly 162, 262 and is incident on a second beam splitter 164, 264. In one preferred embodiment, element 164, 264 is a polarizing beam splitter that transmits p-polarized light and reflects s-polarized light. Because the light incident on 164, 264 has already passed through a 'first' polarizing beam splitter, 160, 260 which transmits, for the most part, p-polarized light along 193B, the light incident on 164, 264 is predominantly p-polarized. Consequently, the light incident on 164, 264 propagates through 164, 264 and is incident on a mirror 166, 266. The mirror 166 is held in place by a mirror clip 167 (shown and labeled in FIGS. 3A-B, 4A-B, and 6A-B). The light incident on mirror element 166, 266 is reflected (pathway 193C) through the optical rotator 168, 268 and onto the object-under-test 190, 290. The lens in 162, 262 is designed such that when 190, 290 is properly positioned relative to reflective mirror 166, 266 the light pattern created by patterned optic 132 (or by patterned wheel 310 in the case of module 200) is in focus. When fixed-patterned optic 132 is shifted by beam 134, the projected pattern of light remains in focus on 3-D surface/object-of-interest 190 and is shifted across 3-D surface/object 190. The optical rotator 168, 268 (pathway 193C) rotates the polarization state of the light reflected from mirror 166, 266 from p-polarized light to circularly polarized light. In this manner, the projected pattern of light is appropriately shifted to provide the required pattern for a structured light triangulation measurement.

The incident circularly polarized light is scattered from 190, 290 (pathway labeled 195A). A portion of the scattered light is within acceptance angle of the optical system. This light is collected and propagates along pathways 195B and 195C (best viewed in enlargements FIGS. 3B and 5B) to the image sensor 172. The scattered light (195A) from 190 is incident onto 168. The scattered light is circularly polarized. Optical rotator 168, 268 rotates the incident circularly polarized light to s-polarized linearly polarized light; this light is incident on second beam splitter 164, 264. Any p-polarized light incident on beam splitter element 164, 264 is transmitted and no longer propagates through the optical system. The s-polarized light incident on second beam splitter 164, 264 is reflected into projection/camera lens assembly 162, 262. The triangulation angle, an important parameter in making high quality three dimensional measurements for both apparatus/module 100 and 200, is established by the angle between second beam splitter 164, 264 and mirror element 166, 266 (labeled 169 in FIGS. 3A-B, for reference).

The light reaching the image sensor 172, 272 is focused onto 172, 272 by projection/camera lens assembly 162, 262. The mount 174, 274 for image sensor 172, 272 functions to holds the sensor 172, 272 in place to ensure that the image of surface/object 190, 290 remains focused on image sensor 172, 272. The heat sink 176, 276 for image sensor 172, 272 ensures that 172, 272 remains at the proper temperature for optimal measurements. Image sensor 172, 272 is mounted onto the image sensor board 170, 270 and is controlled by the image sensor control circuitry 180, 280. Local control of the entire system is managed by the system controller 186, 286. Connection to a processing unit (e.g., a 'personal computer' regardless of flavor of operating system) for power, data transfer and module/system control of a module 100, 200 is accomplished through the input and output (IO) connector/interface 184, 284.

3-D measurements may be made according to the following procedure, by way of example:
1. Power is applied to the system through 184
2. 186 communicates to 180; 172 is turned on and is awaiting an input trigger
3. 186 communicates with 182; 130 is reset to the initial position
4. 186 turns on 122
5. A host PC polls a register via 184 to determine if the system is ready; when the system is ready, measurements begin
6. 186 instructs 182 to apply a voltage to 130 and send a trigger signal to 180
7. 180 instructs 172 to capture an image; when the image is capture, 180 informs 186 that the image is available
8. 186 transfers the captured image via 184 to a host PC where the image information is stored
9. Steps 6 through 8 are repeated until 130 completes the required number of linear shifts; in a preferred embodiment, described herein, the required number of shifts is eight
10. Once the final number of shifts of 130 and the corresponding images captured by 172 are completed, the series of images captured are used to calculate the three dimensional shape of 190 per the method described in below and illustrated in FIG. 15 at 500.

Recall, U.S. Provisional Patent Application 61/371,626, Liu et al. (referred to throughout as Prov App '626)—and the utility application claiming priority thereto, referred to throughout as simply, Util App '607—disclose an implementation of the dual frequency pattern whereby a mathematical description of the dual frequency pattern is employed to generate a computer image file, the image file being subsequently transferred to a digital projector. This technique, while flexible and unique, is cumbersome and not readily implemented in a compact SLI measurement module. As contemplated and further unique in the instant application (as well as U.S. patent application Ser. No. 13/297,233 and Ser. No. 13/297,246 owned and filed on behalf of the assignee hereof)—leveraging off the dual frequency pattern technique disclosed in Prov App '626 and Util App '607—an SLI pattern may be etched, deposited, or otherwise fixed into a silicon substrate to produce a fixed-pattern optic. The etched silicon fixed-pattern member/optic is then translated to provide the shifts in phase necessary for making a triangulation measurement.

Silicon is opaque to visible light at room temperature (acting like a mirror to reflect it, since electromagnetic radiation in the visible light spectrum is by-and-large unable to penetrate the silicon). In one preferred embodiment, optical wavelengths in the range of 300 nm to 1000 nm are used. Over this range of wavelengths, light does not propagate through the silicon plate. In order to project the pattern, holes are etched into the silicon plate. Consider the area of the silicon plate: in locations with holes, the light is transmitted and in places where silicon remains the light is blocked. In this manner, a pattern can be projected. In order to project grayscale values, a process similar to half-toning was used in when etching the silicon. While the technique of half-tone printing exists (see, for example, Nagano U.S. Pat. No. 4,059,481 Method of making an intaglio halftone gravure printing plate issued 22 Nov. 1977); the application of half-tone techniques to the process of etching (or otherwise fixing) a silicon substrate with an SLI pattern having half-tone characteristics to create a MEMS device adapted for projecting a dual-frequency SLI pattern, is extremely novel.

The use of semiconductor processing enables etching of very small features. Consider, by way of example only, a tiny hole etched through a silicon plate that is square and is five micrometers on each side: this sized hole will may be referred to as a projected pixel. Next, assume that the minimum resolvable spot projected onto the object-under-test 190 is produced by an area equivalent to nine projected pixels. If all nine pixels are etched, the brightness of the spot from those nine pixels on 190 is a maximum. If none of the pixels are etched, no light is transmitted to the spot on 190: this is the minimum intensity. If one or more pixels but less than nine are etched, the project intensity on the spot on 190 will be an intermediate value. In this manner, grayscale levels can be projected.

Figure 14B:
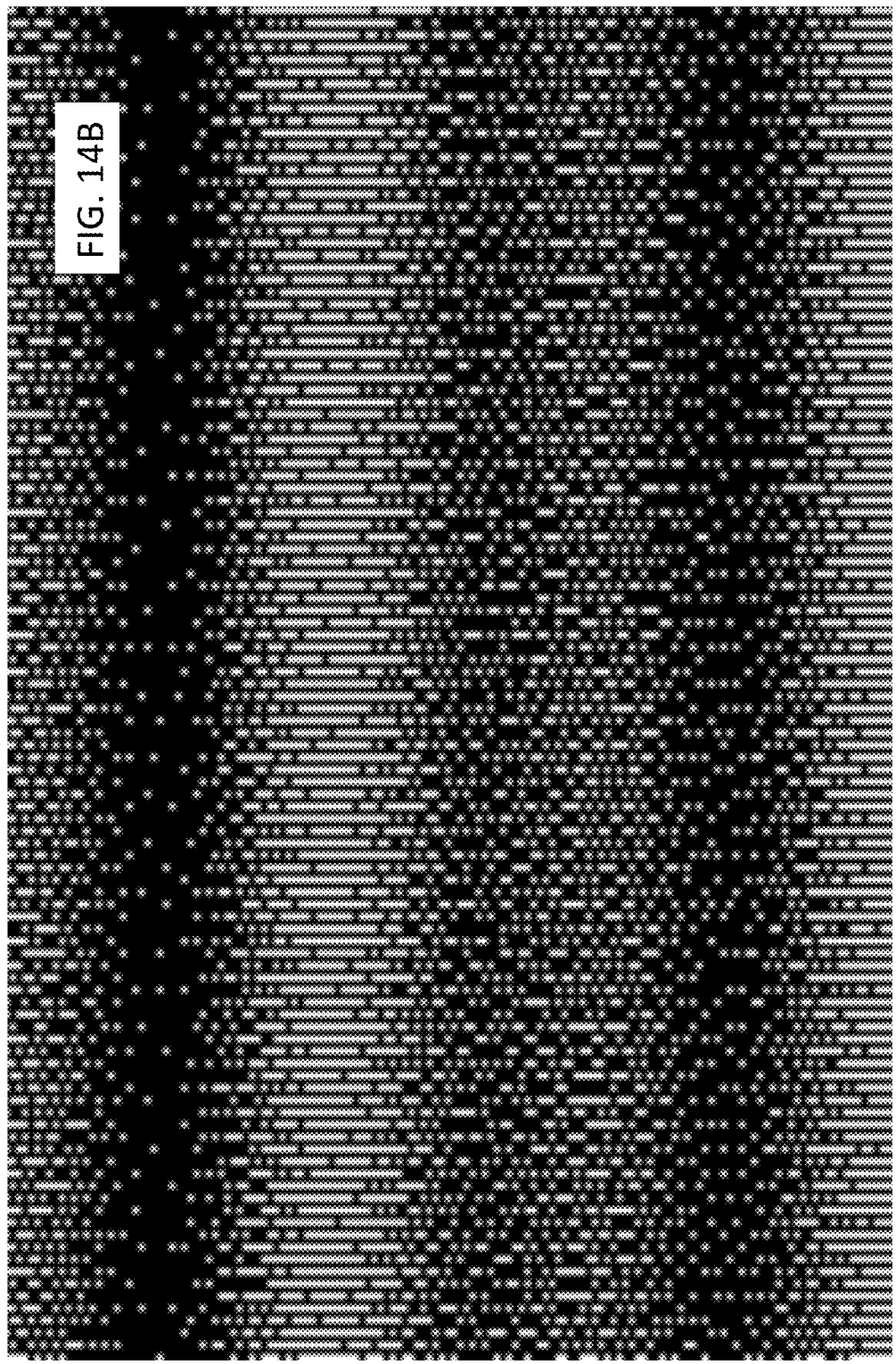
FIGS. 14B, 14C each depict enlarged, i.e., magnified, plan views 410.1, 410.2, respectively, of the light pattern 410 shown in FIG. 14A. One can better appreciate the unique nature of pattern 410 in enlarged views 410.1, 410.2: Uniquely, a half-toning process is used to create pattern 410. During the etching process, whether in silicon, metal, or other suitably supportive substrate, material is removed, e.g., etched, (or an opaque material may be deposited atop a transparent substrate) in a preselected pattern to—in operation during projection—allow light to propagate through the etched (transparent) regions. In the opaque regions where material remains, all light is blocked in operation during projection. In the regions where material has been removed (e.g., etched) all of the light is transmitted for projecting on a surface/subject/object-of-interest/under-test or inspection. To achieve intermediate (gradient) light levels to replicate the gradients found in a sinusoidally varying intensity pattern, a process similar to half-toning was used: the intensity of projected light is averaged over a local area to achieve a preselected intermediate value. Combinations of tiny holes (where material has been removed, e.g., etched), and opaque areas (where material remains intact) are used to create preselected gradient (intermediate light) values, in operation during projection of the pattern 410.
Figure 14C:
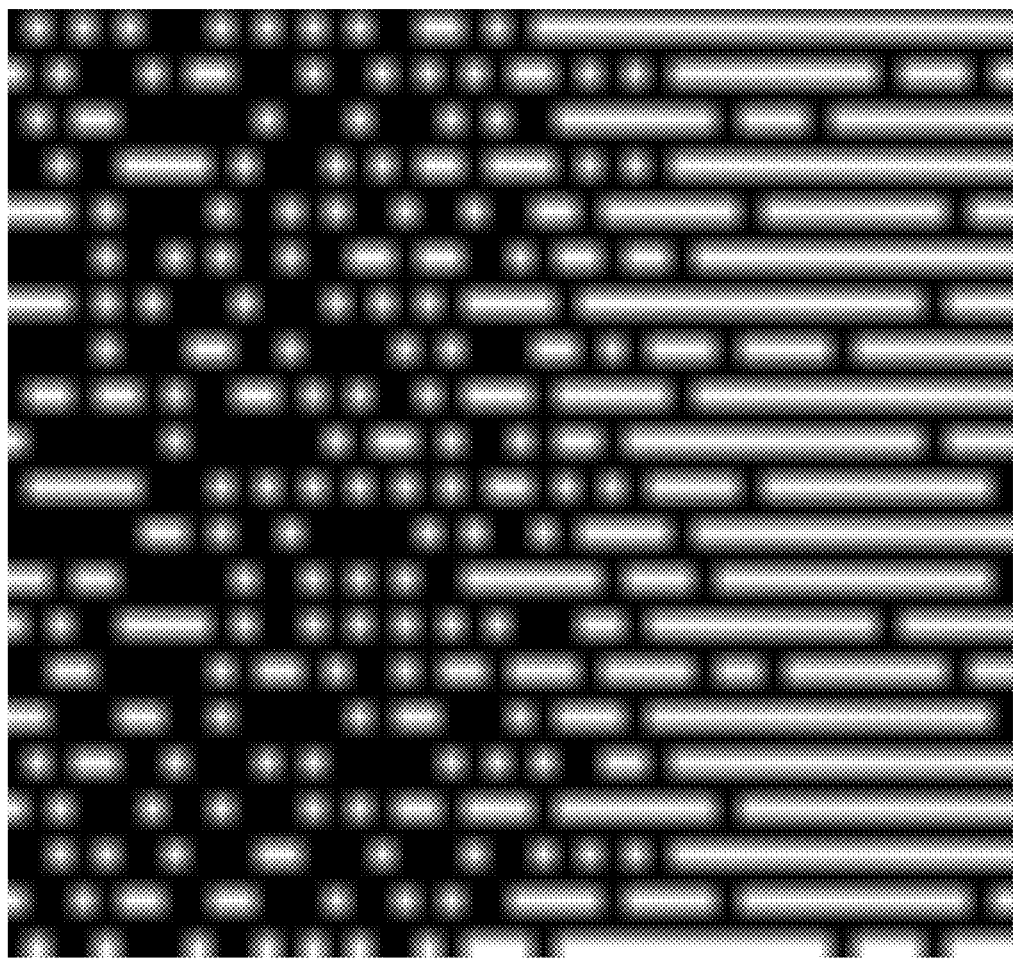
Figure 19:
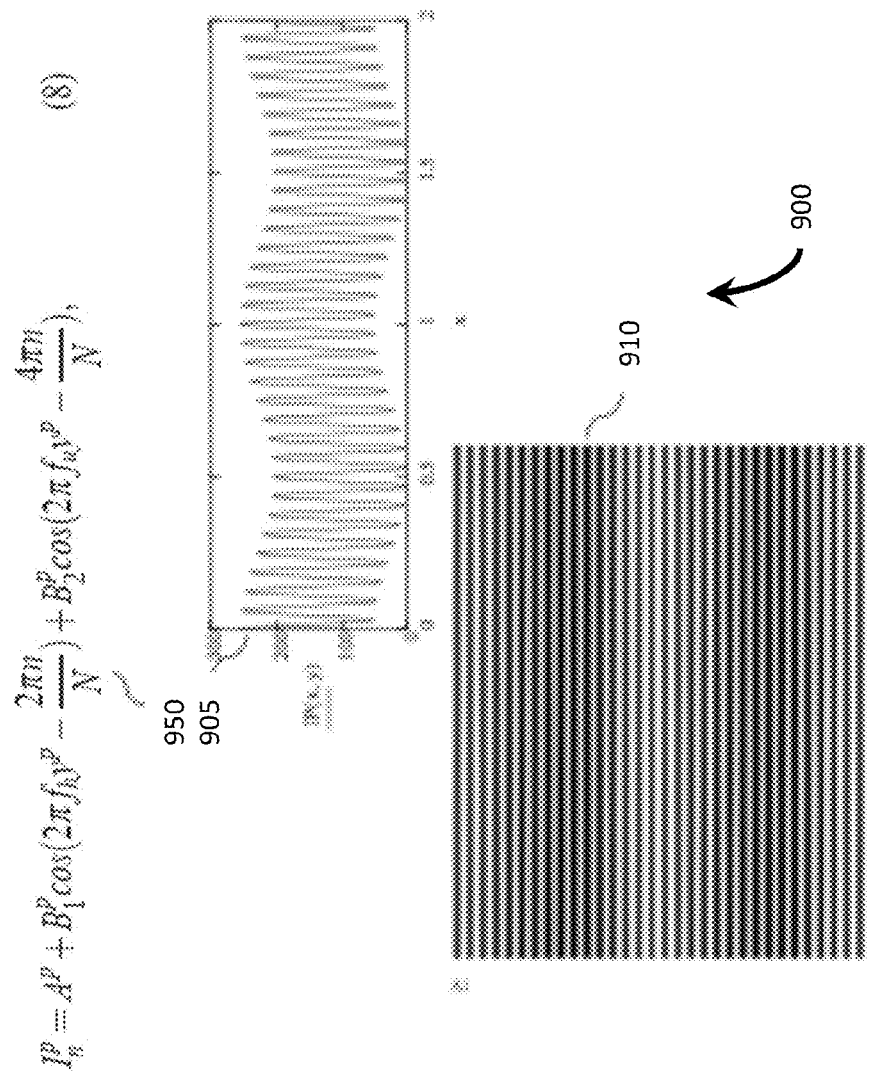
FIG. 19 graphical representation 910 depicts a pixel profile intensity pattern using expression 950, explained in greater detail in Section A., hereof (also published as 1 Mar. 2010/Vol. 18, No. 5/Optics Express 5233) where it is labeled Eqn. (8). A pattern projected according to 950 (whether physically etched or deposited onto a substrate) may preferably be comprised of, for example, a high frequency sine wave pattern and a low frequency sine wave pattern, such as is represented at 905.

FIG. 14A at 410 depicts a preferred embodiment of the pattern implemented for projection from linear pattern shifting device 130. As represented in FIG. 19 at 900, the dual-frequency nature (see Prov. App. '626 and in Section A., hereof, also published as 1 Mar. 2010/Vol. 18, No. 5/Optics Express 5233) of the pattern 410 can be seen. The pattern is a composite of two sinusoidal patterns; this pattern 410 is achieved by etching, depositing, or otherwise fixing in silicon. FIGS. 14B-C are magnified views of FIG. 14A. The point spread function of the optical system, as implemented herein, causes the patterns as fabricated using discrete half-toning (best viewed in enlarged view FIG. 14C) to become somewhat out of focus: the discrete nature of the pattern will no longer be visible and the projected pattern will become a more smoothly varying sum of two sinusoidal patterns.

Figure 8A:
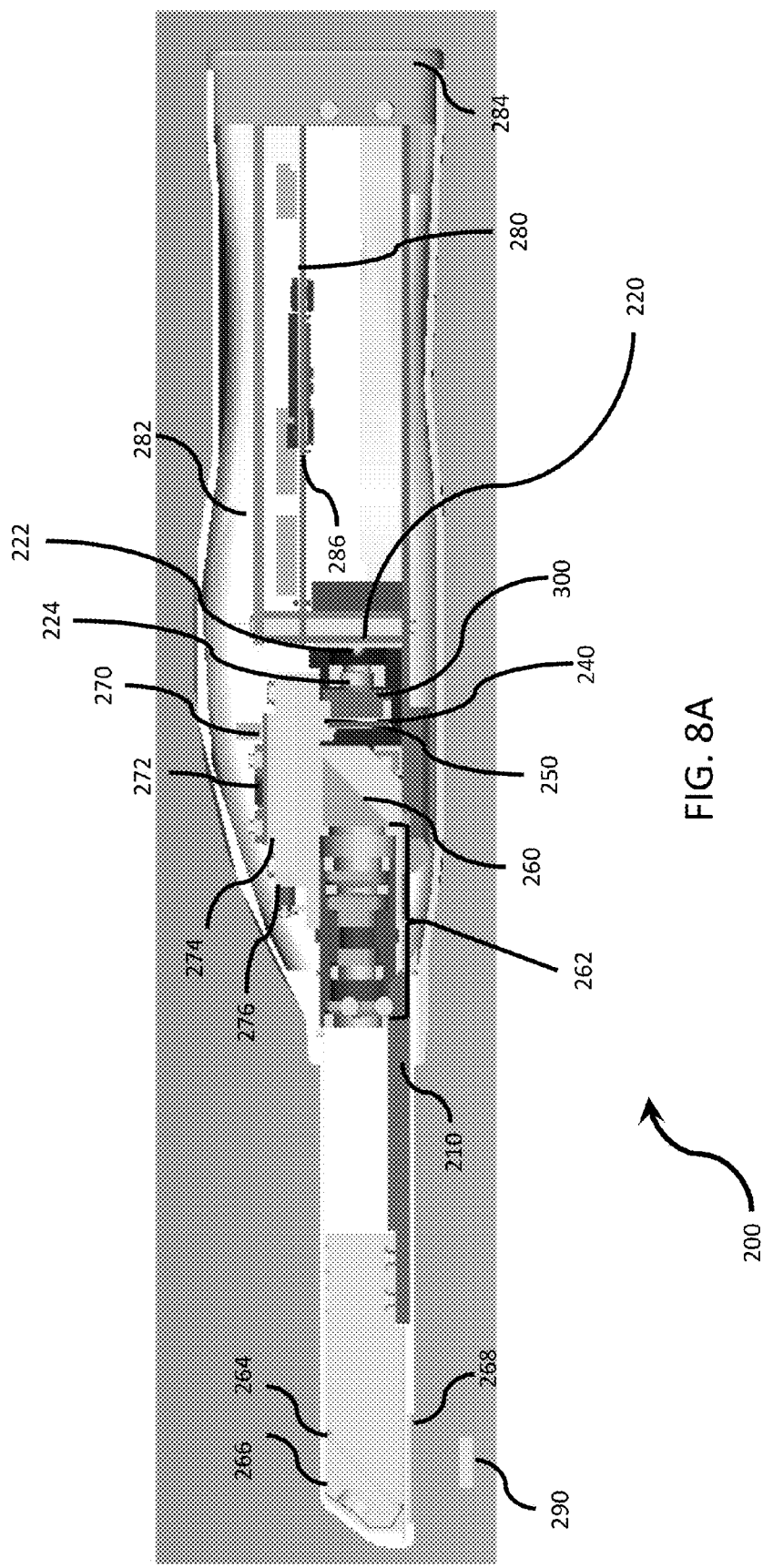
FIGS. 8A, 8B each include cross-sectional views of a preferred portable measurement module 200 implemented according to the invention using structured light.
Figure 8B:
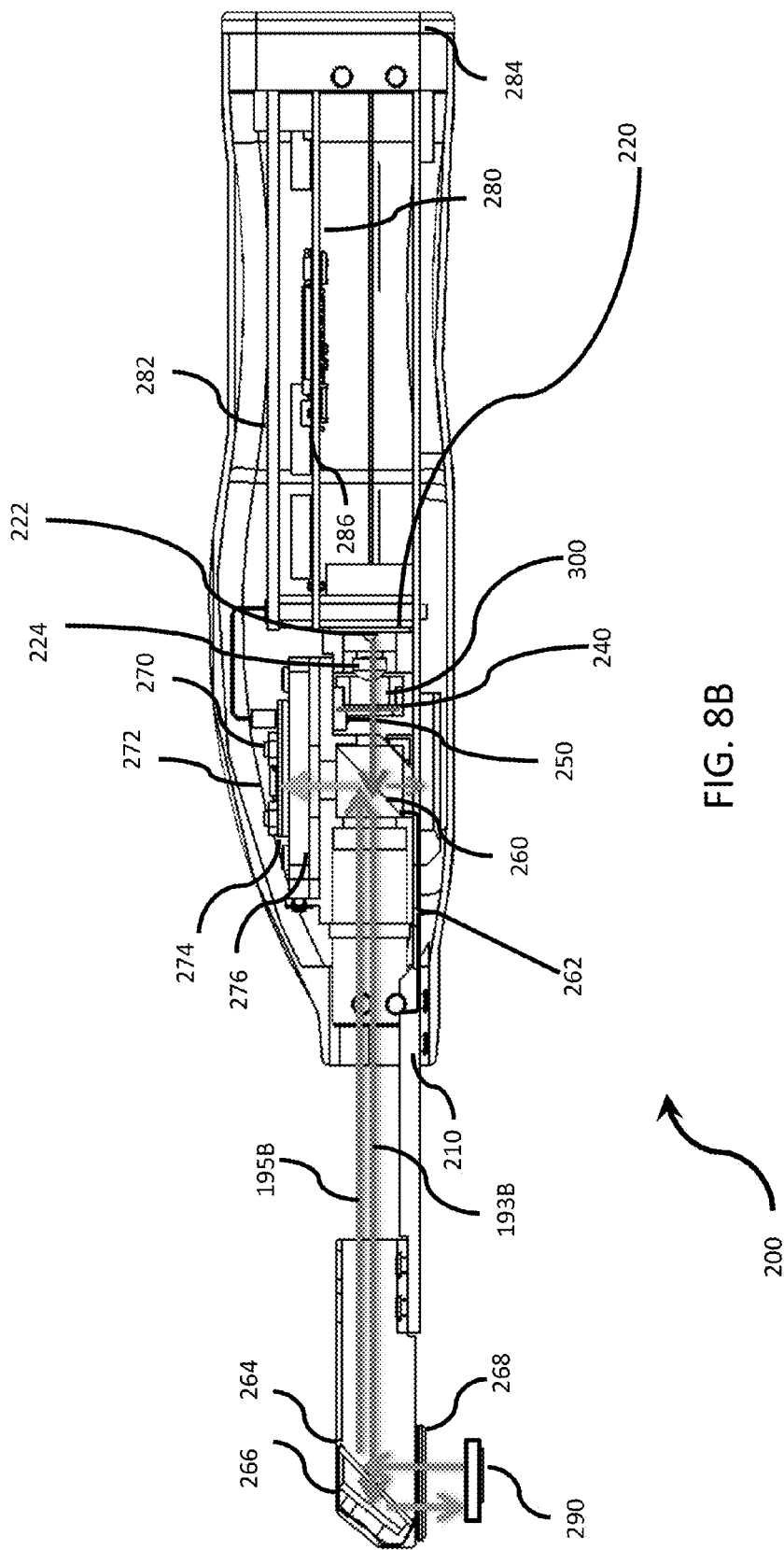

FIGS. 8A-8B detail a structured light measurement apparatus/module 200 with a rotating pattern shifting device 300. The rotating pattern shifting device 300 is comprised of pattern optical wheel 310, center hole/aperture 360 for mounting motor, mount 370 for attaching pattern optical wheel to the motor 380, and mechanical support/mount 250 for the rotating pattern shifting device. Wheel 310 is affixed to 380 via 360 and is held in place by 370. The entire assembly is mounted to 200 by suitable mechanical means such as that labeled 250.

FIG. 10 is a front plan view of the pattern (dark represents material, light represents an opening through which light can pass) etched into pattern optical wheel 310. In a preferred embodiment, passing light from front to back through the etched pattern in wheel 310 results in the projection of light that, across a field of view, varies linearly in intensity along one direction and is constant along the other direction. Thus, rotating optical wheel 310 causes the pattern to shift spatially. The spatial shift occurs on the direction in which the intensity of the light varies. In addition to the pattern, a set of synchronization holes, or apertures, labeled 340, 350 are etched into the optical wheel. One set 340 provides timing marks that behave as optical switches to open and close the shutter in the camera. Hole/aperture 350 provides a single timing mark for recording (and tracking) the rate of rotation of the optical wheel. A voltage and current applied to motor 380 causes wheel 310 to rotate. As 310 rotates, control circuitry 282 monitors aperture 350 to identify a zero phase shift location of low frequency pattern. An electrical signal is generated once per revolution and used to identify the zero phase position of wheel 310; this signal is transmitted from control circuitry 282 to IO connector 284. Connector 284 functions as an IO interface for power, data, and control signals to and from module 200.

In addition to monitoring aperture 350, circuitry 282 also tracks movement of aperture 340 for synchronization with camera. In one preferred embodiment, control circuitry 282 comprises a photo-interrupter circuit to generate a voltage when aperture 340 is passing in front of the photo-interrupter circuit. This voltage signal is transmitted to image sensor control circuitry 280 and is used to control the opening and closing of the image sensor shutter. The leading edge of aperture 340 (note elongated rectangular-arc shape) generates a rising voltage that triggers the beginning of image acquisition. The trailing edge of the elongated arc-rectangle 340 generates a falling voltage that triggers the end of image acquisition. The total acquisition time is a function of the rotation rate of wheel 310, the arc-length of aperture 340, and any delays that are incorporated in control circuitry 282 for device 300 and image sensor circuitry 280. There are eight dual frequency patterns, represented generally in FIG. 10 by labels 320, 322, 324, 326, 330, 332, 334, 336 on the wheel 310. Each pattern subtends and arc of 45 degrees. Each pattern has its own dedicated hole/aperture (elongated arc-rectangular in shape, by way of example, one is labeled 340 for reference) for synchronization with camera. The projected pattern from 310 is a dual frequency pattern that, in one direction, varies spatially according to the frequency content of the pattern and in the other direction does not vary. The projected pattern resulting from light passing through segment 322 is shifted spatially by 45 degrees relative to the projected pattern resulting light passing though segment 320. In like manner, the relative spatial shifts between 324 and 322, 326 and 324, 330 and 326, 332 and 330, 334 and 332, 336 and 334, and 320 and 336 are 45 degrees each. A mechanical mount 250 is shown for supporting rotating pattern shifting device 300.

Using apparatus/module 200, 3-D measurements may be made employing the following process:
1. Power is applied to the system through 284
2. 286 communicates to 280; 272 is turned on and is awaiting an input trigger
3. 286 communicates with 282
4. 286 turns on 222
5. A host PC polls a register via 284 to determine if the system is ready; when the system is ready, measurements begin
6. 286 instructs 282 to apply a voltage to 380
7. 310 rotates; the leading edge of 340 is observed by 282 and a trigger signal is sent to 280
8. 280 instructs 272 to begin image capture
9. The trailing edge of 340 is observed by 282 and a trigger signal is sent to 280
10. 280 instructs 272 to end image capture
11. 286 transfers the captured image via 284 to a host PC where the image information is stored along with a time stamp for when the image was captured
12. Steps 8 through 11 are repeated until 310 completes a full revolution; in a preferred embodiment, described herein, a full revolution of 310 results in eight captured images
13. Asynchronously with steps 8 through 11, 282 observes 350 and provides a trigger signal to 280; 280 logs the time stamps of this signal
14. Once the final number of shifts of 310 and corresponding image captures by 272 and the time stamp of 350 are completed, the series of images captured, plus the corresponding time stamps, are used to calculate the 3-D shape of 290 per the technique represented in by FIG. 15 at 500.

As represented graphically in FIGS. 16A-C at 600, a first measured point cloud 610 and a second measured point cloud 620 are shown combined to produce a single interlaced point cloud 630. This well known optical process is referred to as image 'stitching'. U.S. Pat. No. 6,407,735 "Method for generating surface representations of objects from layered data" granted to Kenneth R. Kressin, details useful background technology examples concerning the digital optics technique of stitching point clouds.

Measurement module 100, 200 assigns the XYZ value of each point acquired from the object-under-test 190, 290 based on the coordinate system determined during the calibration of the module 100, 200. The equation for this is shown at 500 (FIG. 15) XYZ position calculation for standard structured light triangulation method 550; for further reference regarding application of techniques suggested at 500, see also Jielin Li, Laurence G. Hassebrook, and Chun Guan, "Optimized two-frequency phase-measuring-profilometry light-sensor temporal-noise sensitivity," J. Opt. Soc. Am. A 20, 106-115 (2003). The calibration coefficients, $m_{ij}$, shown in 550, relate the position of the object-under-test 190, 290 to the coordinate system of 100, 200.

In one mode of operation, multiple measurements of the object-under-test 190, 290 are taken at different relative positions to 190, 290. This results in a rotation and translation between the coordinate system of 100, 200 and respective coordinate system of 190, 290. Calculation of the relative rotations and translations between 100, 200 and 190, 290 will allow all measurements to be translated into the coordinate system of 190, 290. In this manner, alignment and integration of the individual measurements into a single measurement can be accomplished.

Figure 18:
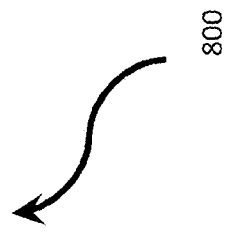

FIGS. 17A-D labeled generally at 700 shows a mathematical description of an arbitrary rotation about three orthogonal axes. FIG. 18 labeled generally at 800 shows a mathematical description of an arbitrary translation along three orthogonal axes. In the present invention, the system controller 186, 286 samples the output of a device 130, 300 that monitors changes in rotation along three orthogonal axes and changes in position on three orthogonal axes. The data is then assembled into the matrices as indicated in 700 and 800 and applied to the collected point clouds, for example 610 and 620 to enable assembly of the data into a single point cloud 630.

While certain representative embodiments and details have been shown for the purpose of illustrating features of the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the applicants do not intend to invoke 35 U.S.C. §112 ¶6 in a manner that unduly limits rights to its claimed invention. Furthermore, in any claim that is filed herewith or hereafter, any means-plus-function clauses used, or later found to be present, are intended to cover at least all structure(s) described herein as performing the recited function and not only structural equivalents but also equivalent structures.

We claim:

1. A surface measurement module for 3-D image acquisition of a subject-under-inspection, the module comprising:
   (a) a casing to house a pattern shifting device from which an output comprising a multi-frequency pattern comprising a plurality of pixels representing at least a first and second superimposed sinusoid of light from a light source, is directed at a polarizing beam splitter,
   (b) each said pixel of said plurality of pixels comprised of said first sinusoid having a first frequency distinct from a second frequency of said second sinusoid;
   (c) the polarized output of said splitter directed through a lens assembly comprising at least one lens element;
   (d) a reflector to direct said polarized output exiting said lens assembly, to illuminate a surface of the subject-under-inspection;
   (e) a scattered light illumination off said surface is directed back to said reflector and then through said lens assembly for capture by an image sensor; and
   (f) said casing also housing said polarizing beam splitter, said lens assembly, and said image sensor.

2. The surface measurement module of claim 1 further comprising:
   (a) a quarter-wave plate interposed between said surface of the subject-under-inspection and a pathway directed to said lens assembly; and
   (b) a plurality of images captured of said scattered light illumination, after passing back through said lens assembly, off said surface being used for the 3-D image acquisition.

3. The surface measurement module of claim 1 positioned for inspection of said surface having been selected from the group consisting of: a surface of mammalian tissue; a surface of an interior of a pipeline; a surface within a cavity of a hydraulic system; a surface of a semiconductor wafer undergoing fabrication; a surface of a printed circuit board (PCB) undergoing testing; and a surface of a product undergoing manufacture.

4. The surface measurement module of claim 3 wherein said surface of mammalian tissue comprises a surface located within a mammalian oral cavity; and said product undergoing manufacture is selected from the group consisting of parts, assemblies, foodstuff, and packaging.

5. The surface measurement module of claim 1, wherein said pattern shifting device comprises a fixed-pattern optic having said multi-frequency pattern fixed into a substrate support.

6. The surface measurement module of claim 5, wherein said multi-frequency pattern is fixed into said substrate support such that an output of said fixed-pattern optic has half-tone characteristics during said projection onto said surface of the subject-under-inspection.

7. The surface measurement module of claim 5, wherein said multi-frequency pattern is fixed by etching said substrate support, said substrate support selected from the group consisting of silicon and metal substrate.

8. The surface measurement module of claim 5, wherein said multi-frequency pattern is fixed by incorporating a reflective material into said substrate support, said substrate support selected from the group consisting of silicon-based glass and silicon.

9. The surface measurement module of claim 5, wherein said multi-frequency pattern is fixed by depositing a material onto said substrate support, said substrate support selected from the group consisting of silicon-based glass and silicon.

10. The surface measurement module of claim 5, wherein said pattern shifting device further comprises a shifting element comprising an element for linear shifting of said multi-frequency pattern.

11. The surface measurement module of claim 10, wherein said element is conductive and to which, in operation, a voltage is applied.

12. The surface measurement module of claim 1, wherein:
(a) said pattern shifting device comprises a fixed-pattern wheel; and
(b) said wheel set in motion causes a spatial shift such that said output of said pattern shifting device comprises said multi-frequency pattern.

13. The surface measurement module of claim 1, wherein said pattern shifting device comprises a fixed-pattern optic having said multi-frequency pattern fixed into a substrate support by incorporating therein a reflective material comprising at least one mirror.

14. The surface measurement module of claim 1, wherein said pattern shifting device comprises:
(a) a fixed-pattern optic having said multi-frequency pattern fixed into a substrate support; and
(b) a shifting element.

15. The surface measurement module of claim 14, wherein said shifting element and said fixed-pattern optic are integrated such that a reflective material component comprising at least one mirror is incorporated into said substrate support.

16. A surface measurement module for 3-D image acquisition of a subject-under-inspection, the module comprising:
(a) a casing to house a pattern shifting device from which an output of light from a light source is directed at a polarizing beam splitter;
(b) the polarized output of said splitter directed through a lens assembly comprising at least one lens element;
(c) a reflector to direct said polarized output exiting said lens assembly, to illuminate a surface of the subject-under-inspection;
(d) a scattered light illumination off said surface is directed back through said lens assembly for capture by an image sensor;
(e) said casing also housing said polarizing beam splitter, said lens assembly, and said image sensor; and wherein:
(i) said output of said pattern shifting device comprises a multi-frequency pattern comprising a plurality of pixels representing at least a first and second superimposed sinusoid projected simultaneously; and
(ii) each of the sinusoids represented by the pixels have a unique temporal frequency and each of the pixels projected to satisfy $$I_n^p = A^p + \sum_{k=1}^{K} B_k^p \cos\left(2\pi f_k y^p + \frac{2\pi k n}{N}\right) \quad \text{Eq. (1.1)}$$

where $I_n^p$ is the intensity of a pixel in the projector for the $n^{th}$ projected image in a particular moment in time; K is an integer representing the number of component sinusoids, each component sinusoid having a distinct temporal frequency, where K is less than or equal to (N+1)/2; the parameter $B_k^p$ represents constants that determine the amplitude or signal strength of the component sinusoids; $A^p$ is a scalar; $f_k$ is the spatial frequency of the $k^{th}$ sinusoid corresponding to temporal frequency k; and $y^p$ represents a spatial coordinate in the projected image.

17. A surface measurement module for 3-D image acquisition of a subject-under-inspection, the module comprising, the module comprising:
(a) a casing to house a pattern shifting device from which an output comprising a multi-frequency pattern comprising a plurality of pixels representing at least a first and second superimposed sinusoid of light from an incoherent light source is directed at a polarizing beam splitter;
(b) the polarized output of said splitter directed through a lens assembly comprising at least one lens element;
(c) a reflector to direct said polarized output exiting said lens assembly, to illuminate a surface of the subject-under-inspection;
(d) a scattered light illumination off said surface is directed back through said lens assembly for capture by an image sensor; and
(e) wherein said first and second superimposed sinusoid are projected simultaneously, and each of the sinusoids represented by the pixels have a unique temporal frequency and each of the pixels projected to satisfy $$I_n^p = A^p + \sum_{k=1}^{K} B_k^p \cos\left(2\pi f_k y^p + \frac{2\pi k n}{N}\right) \quad \text{Eq. (1.1)}$$

where $I_n^p$ is an intensity of a pixel for an $n^{th}$ projected image in a particular moment in time; K is an integer representing a number of component sinusoids, each component sinusoid having a distinct temporal frequency, where K is less than or equal to (N+1)/2, said output comprising at least N projected patterns; a parameter $B_k^p$ represents constants that determine an amplitude or signal strength of said component sinusoids; $A^p$ is a scalar; $f_k$ is a spatial frequency of a $k^{th}$ sinusoid corresponding to a temporal frequency k; and $y^p$ represents a spatial coordinate in an image projected as a result of said output.

18. The surface measurement module of claim 17, wherein:
  (a) said pattern shifting device comprises a fixed-pattern optic having said multi-frequency pattern fixed into a substrate support; and
  (b) said casing also housing said polarizing beam splitter, said lens assembly, and said image sensor.

19. The surface measurement module of claim 18, wherein said pattern shifting device further comprises a shifting element comprising a conductive element for linear shifting of said multi-frequency pattern to which, in operation, a voltage is applied.

20. The surface measurement module of claim 18, wherein said multi-frequency pattern is fixed by incorporating a reflective material comprising at least one mirror into said substrate support.

* * * * *